(12) United States Patent
May

(10) Patent No.: US 7,976,234 B2
(45) Date of Patent: Jul. 12, 2011

(54) MULTI-CHAMBERED DISPENSER AND PROCESS

(75) Inventor: Richard J. May, Saylorsburg, PA (US)

(73) Assignee: James Alexander Corporation, Blairstown, NJ (US)

( * ) Notice: Subject to any disclaimer, the term of this patent is extended or adjusted under 35 U.S.C. 154(b) by 1456 days.

(21) Appl. No.: 11/414,154

(22) Filed: Apr. 28, 2006

(65) Prior Publication Data

US 2007/0253761 A1 Nov. 1, 2007

(51) Int. Cl.
*B43K 5/14* (2006.01)

(52) U.S. Cl. ............... 401/132; 401/119; 222/541.4; 222/541.6

(58) Field of Classification Search .......... 401/132–135, 401/34, 35; 222/541.4, 541.6
See application file for complete search history.

(56) References Cited

U.S. PATENT DOCUMENTS

| | | |
|---|---|---|
| 1,229,195 A | 6/1917 | Hamilton |
| 1,332,985 A | 3/1920 | Jarrett |
| 1,587,598 A | 6/1926 | Magg |
| 1,822,566 A | 9/1931 | Davies |
| 2,058,251 A | 10/1936 | Nitardy et al. |
| 2,311,367 A | 2/1943 | Chambers |
| 2,371,667 A | 3/1945 | Arena et al. |
| 2,517,604 A | 8/1950 | Smith |
| 2,546,848 A | 3/1951 | Bishop |
| 2,681,168 A | 6/1954 | McMillion |
| 2,832,087 A | 4/1958 | McEwan |
| 3,029,987 A | 4/1962 | Gronemeyer |
| 3,124,828 A | 3/1964 | Barber et al. |
| 3,152,352 A | 10/1964 | Kosik, Jr. |
| 3,216,562 A | 11/1965 | Lockwood |
| 3,248,017 A | 4/1966 | Allen |
| 3,399,020 A | 8/1968 | Margolis et al. |
| 3,457,014 A | 7/1969 | Ward |

(Continued)

FOREIGN PATENT DOCUMENTS

BE 501779 3/1951

(Continued)

OTHER PUBLICATIONS

Douglas M. Bryce, Plastic Injection Molding . . . material selection and product design fundamentals, Jul. 1, 1997, pp. 258-261, vol. II: Fundamentals of Injection Molding Series, Society of Manufacturing Engineers.

(Continued)

*Primary Examiner* — Huyen Le
(74) *Attorney, Agent, or Firm* — Banner & Witcoff, Ltd.

(57) ABSTRACT

A dispenser (10) for dispensing flowable materials has a container assembly (12) having a dividing wall (19). A first chamber (18) and a second chamber (20) are defined in the container assembly (12). The first chamber (18) is configured to contain a first flowable material (M1) (140) and the second chamber (20) is configured to contain a second flowable material (M2) (142). A membrane (34) is positioned in the container and cooperates with the dividing wall (19) to enclose the first and second chambers (18, 20). The membrane (34) has a first section (132) having a first weld seam (148) and a second section (134) having a second weld seam (150). The first section (132) is separated from the second section (134) by a non-rupturable member (33). Rupture of the membrane (34) allows the flowable materials into a third chamber (42) in which the flowable materials mix to form a mixture, and from which the mixture is dispensed.

49 Claims, 8 Drawing Sheets

U.S. PATENT DOCUMENTS

| | | | |
|---|---|---|---|
| 3,481,513 | A | 12/1969 | Ram |
| 3,482,920 | A | 12/1969 | Schwartzman |
| 3,521,637 | A | 7/1970 | Waterbury |
| 3,584,211 | A | 6/1971 | Rauhut |
| 3,614,245 | A | 10/1971 | Schwartzman |
| 3,636,922 | A | 1/1972 | Ketner |
| 3,658,719 | A | 4/1972 | McConnaughey |
| 3,684,136 | A | 8/1972 | Baumann |
| 3,702,677 | A | 11/1972 | Heffington |
| 3,741,383 | A | 6/1973 | Wittwer |
| 3,757,782 | A | 9/1973 | Aiken |
| 3,759,259 | A | 9/1973 | Truhan |
| 3,831,742 | A | 8/1974 | Gardella et al. |
| 3,856,138 | A | 12/1974 | Maekawa et al. |
| 3,876,314 | A | 4/1975 | Nehring |
| 3,891,331 | A | 6/1975 | Avery |
| 3,896,552 | A | 7/1975 | Russell |
| 3,896,808 | A | 7/1975 | Szpur |
| 3,924,623 | A | 12/1975 | Avery |
| 3,964,643 | A | 6/1976 | Morane et al. |
| 4,023,580 | A | 5/1977 | Pieters |
| 4,058,425 | A | 11/1977 | Thrun |
| 4,095,596 | A | 6/1978 | Grayson |
| 4,106,652 | A | 8/1978 | Leclabart |
| 4,121,746 | A | 10/1978 | Frohlich et al. |
| 4,183,684 | A | 1/1980 | Avery |
| 4,342,395 | A | 8/1982 | Brown |
| 4,378,069 | A | 3/1983 | Franco |
| 4,432,530 | A | 2/1984 | Marcinek |
| 4,432,749 | A | 2/1984 | Snyder et al. |
| 4,441,227 | A | 4/1984 | d'Argembeau |
| 4,452,262 | A | 6/1984 | Jankewitz |
| 4,572,689 | A | 2/1986 | Chernack |
| 4,620,648 | A | 11/1986 | Schwartzman |
| 4,622,985 | A | 11/1986 | Jankewitz |
| 4,625,140 | A | 11/1986 | Gagnon |
| 4,657,134 | A | 4/1987 | Woodworth et al. |
| 4,674,903 | A | 6/1987 | Chen |
| 4,696,393 | A | 9/1987 | Laipply |
| 4,765,518 | A | 8/1988 | O'Meara |
| 4,780,083 | A | 10/1988 | Croll |
| 4,844,641 | A | 7/1989 | Grosfilley et al. |
| 4,867,326 | A | 9/1989 | O'Meara |
| 4,872,556 | A | 10/1989 | Farmer |
| 4,875,602 | A | 10/1989 | Chickering et al. |
| 4,884,703 | A | 12/1989 | O'Meara |
| 4,927,012 | A | 5/1990 | Rowe |
| 4,940,350 | A | 7/1990 | Kim |
| 4,942,330 | A | 7/1990 | Karlotski et al. |
| 4,946,389 | A | 8/1990 | Weissenburger |
| 4,952,204 | A | 8/1990 | Korteweg |
| 4,973,181 | A | 11/1990 | Jankewitz |
| 4,984,381 | A | 1/1991 | Seifert |
| 4,990,016 | A | 2/1991 | Seidler |
| 5,002,198 | A | 3/1991 | Smith |
| 5,035,348 | A | 7/1991 | Seifert |
| 5,038,455 | A | 8/1991 | Guest |
| 5,042,690 | A | 8/1991 | O'Meara |
| 5,052,589 | A | 10/1991 | O'Meara |
| 5,054,948 | A | 10/1991 | Honda et al. |
| 5,098,297 | A | 3/1992 | Chari et al. |
| 5,100,028 | A | 3/1992 | Seifert |
| 5,105,985 | A | 4/1992 | Kroeber |
| 5,114,240 | A | 5/1992 | Kindt-Larsen et al. |
| 5,118,291 | A | 6/1992 | Varaine |
| 5,133,458 | A | 7/1992 | Miller |
| 5,152,742 | A | 10/1992 | Simpson |
| 5,154,525 | A | 10/1992 | Matsuo |
| 5,169,030 | A * | 12/1992 | Lewin .................. 222/92 |
| 5,172,807 | A | 12/1992 | Dragan et al. |
| 5,180,242 | A | 1/1993 | De Laforcade |
| 5,208,010 | A | 5/1993 | Thaler |
| 5,215,219 | A | 6/1993 | Gallagher |
| 5,228,593 | A | 7/1993 | O'Meara |
| 5,229,061 | A | 7/1993 | Van Dyke et al. |
| 5,236,355 | A | 8/1993 | Brizzolara et al. |
| 5,244,120 | A | 9/1993 | O'Meara |
| 5,269,441 | A | 12/1993 | O'Meara |
| 5,288,159 | A | 2/1994 | Wirt |
| 5,301,837 | A | 4/1994 | O'Meara |
| 5,326,603 | A | 7/1994 | Van Dyke et al. |
| 5,337,764 | A | 8/1994 | McKay |
| 5,376,006 | A | 12/1994 | Fischer |
| 5,378,226 | A | 1/1995 | Hanifl et al. |
| 5,379,898 | A | 1/1995 | Joulia |
| 5,419,450 | A | 5/1995 | Gugliemelli et al. |
| 5,490,736 | A | 2/1996 | Haber et al. |
| 5,529,224 | A | 6/1996 | Chan et al. |
| 5,611,687 | A | 3/1997 | Wagner |
| 5,664,705 | A * | 9/1997 | Stolper .................. 222/212 |
| 5,714,059 | A | 2/1998 | Seifert et al. |
| 5,735,437 | A | 4/1998 | Broyles et al. |
| 5,743,736 | A | 4/1998 | Folko et al. |
| 5,791,801 | A | 8/1998 | Miller |
| 5,826,600 | A | 10/1998 | Rowe et al. |
| 5,853,388 | A | 12/1998 | Semel |
| 5,924,605 | A | 7/1999 | Baudin et al. |
| 5,992,692 | A | 11/1999 | Boissay |
| 6,007,529 | A | 12/1999 | Gustafsson et al. |
| 6,036,005 | A | 3/2000 | Krause et al. |
| 6,039,488 | A | 3/2000 | Krawczyk et al. |
| 6,092,535 | A | 7/2000 | Moore |
| 6,156,208 | A | 12/2000 | Desjardins et al. |
| 6,189,688 | B1 | 2/2001 | Aneas |
| 6,283,933 | B1 | 9/2001 | D'Alessio et al. |
| 6,364,197 | B1 | 4/2002 | Oelgoetz et al. |
| 6,379,069 | B1 | 4/2002 | May |
| 6,419,414 | B1 | 7/2002 | Broyles et al. |
| 6,425,704 | B2 | 7/2002 | Voiers et al. |
| 6,478,191 | B1 | 11/2002 | D'Alessio et al. |
| 6,516,947 | B1 | 2/2003 | Van Dyke et al. |
| 6,517,350 | B2 | 2/2003 | Diasti et al. |
| 6,595,940 | B1 | 7/2003 | D'Alessio et al. |
| 6,641,319 | B2 | 11/2003 | May |
| 6,655,551 | B2 | 12/2003 | Manne |
| 6,705,790 | B2 | 3/2004 | Quintero et al. |
| 6,755,586 | B1 | 6/2004 | Frazier |
| 6,869,242 | B2 | 3/2005 | May |
| 6,874,658 | B2 | 4/2005 | Thomas et al. |
| 6,877,638 | B2 | 4/2005 | Chan et al. |
| 6,976,494 | B2 | 12/2005 | Wayne et al. |
| 2003/0028156 | A1 | 2/2003 | Juliar |
| 2003/0106905 | A1 | 6/2003 | Chan |
| 2003/0209561 | A1 | 11/2003 | Thomas |
| 2004/0092883 | A1 | 5/2004 | Casey, II et al. |
| 2004/0146334 | A1 | 7/2004 | May |
| 2005/0028863 | A1 | 2/2005 | May |

FOREIGN PATENT DOCUMENTS

| | | |
|---|---|---|
| DE | 3246406 A1 | 6/1984 |
| EP | 463658 A1 | 1/1992 |
| FR | 1557786 | 1/1969 |
| FR | 2700698 A | 7/1994 |
| IT | 652178 | 2/1963 |
| JP | 6156513 | 6/1994 |
| NL | 8602366 A | 4/1988 |
| WO | 8809753 A1 | 12/1988 |

OTHER PUBLICATIONS

David B. Guralnik, Editor in Chief, Webster's New World Dictionary of the American Language, 1970, p. 973, 2nd College Edition, The World Publishing Company, New York.

Quidel Corporation, Quick Vue In-Line Strep A test, Instruction Literature, 0563112 (Mar. 2002).

Notification of Transmittal of the International Search Report and the Written Opinion of the International Searching Authority, or the Declaration from PCT Application No. PCT/US2007/067599, dated Feb. 26, 2008.

\* cited by examiner

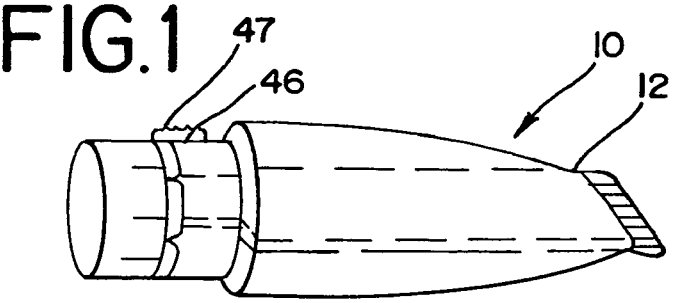
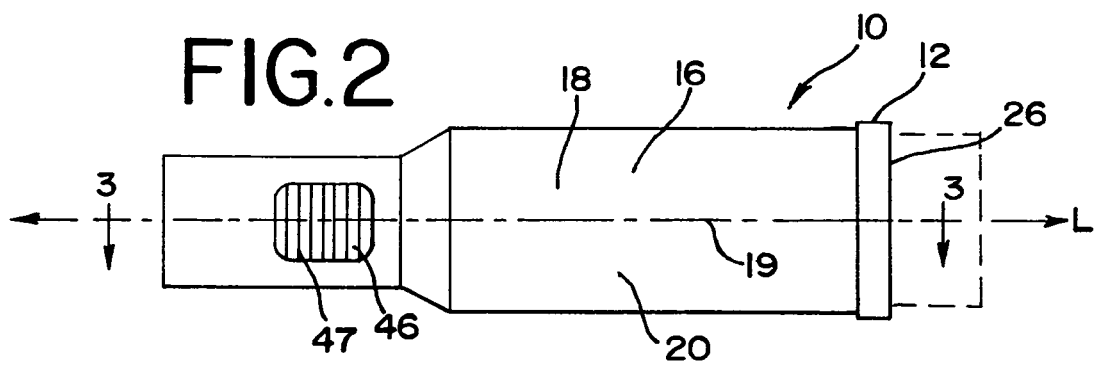
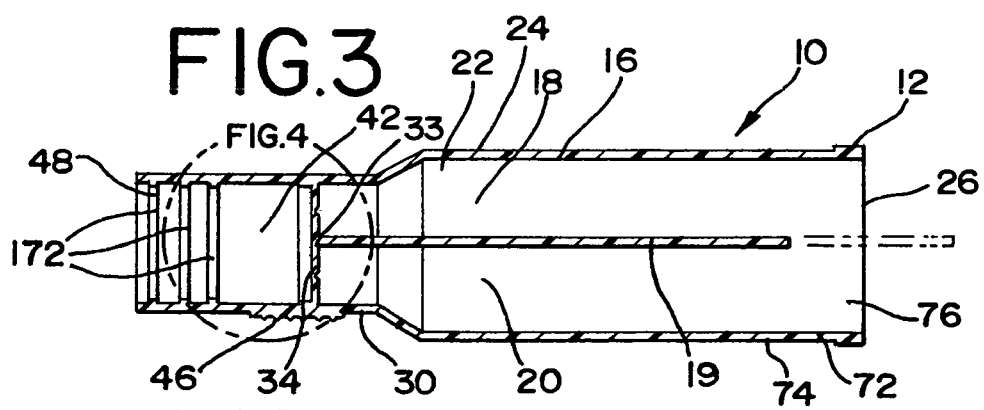
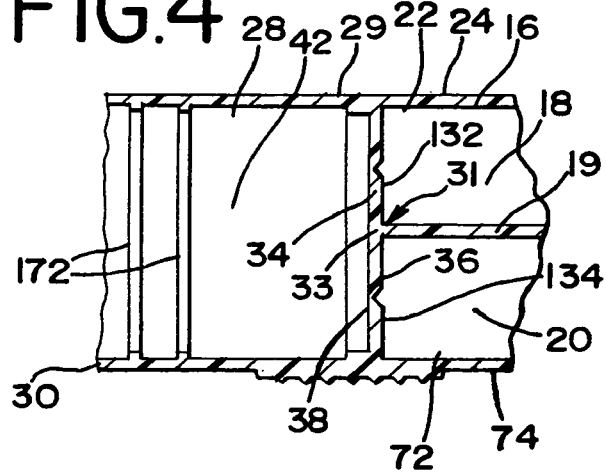

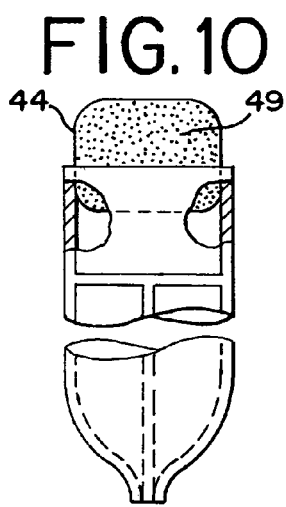
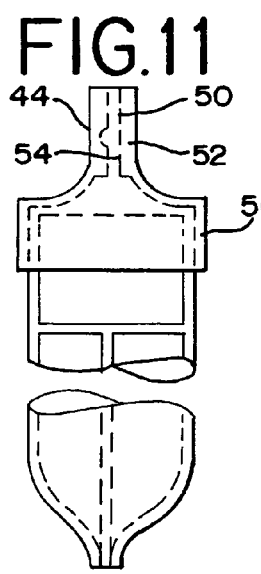
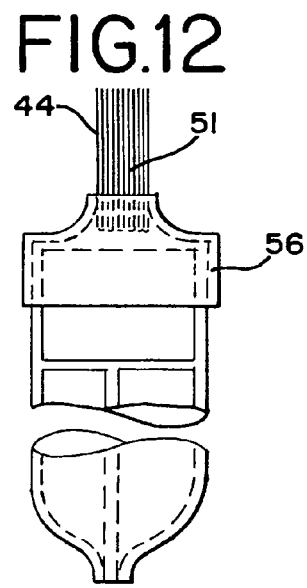
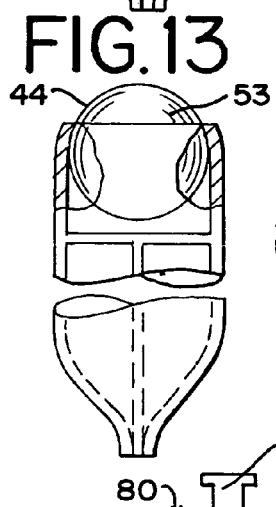
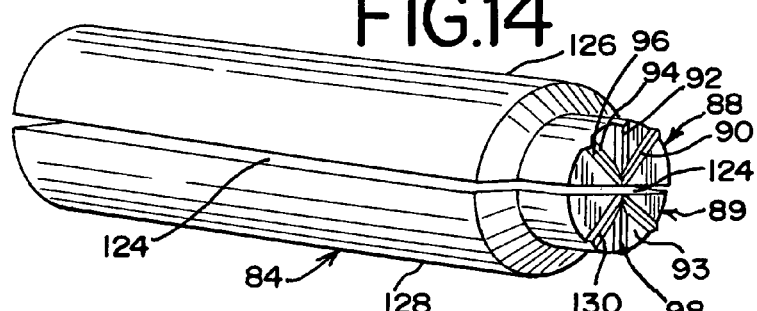
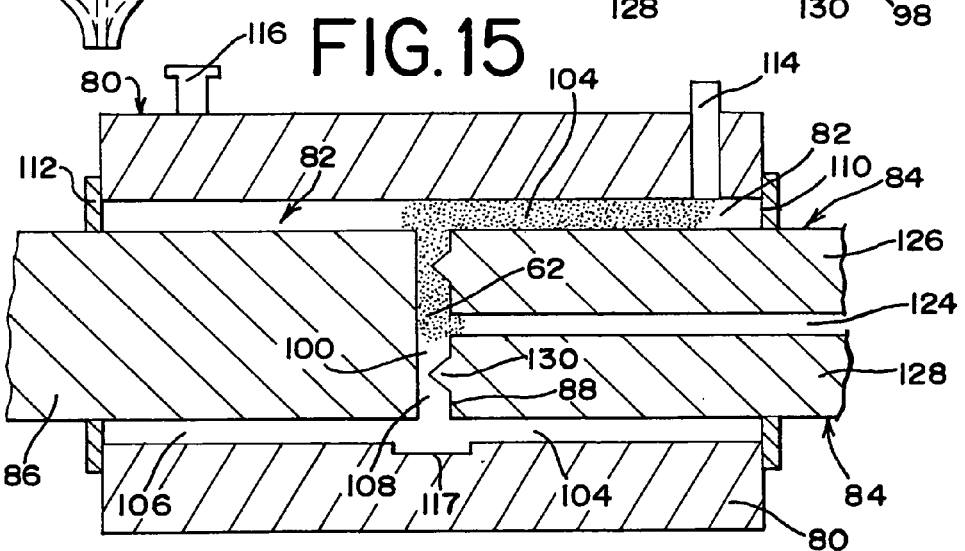

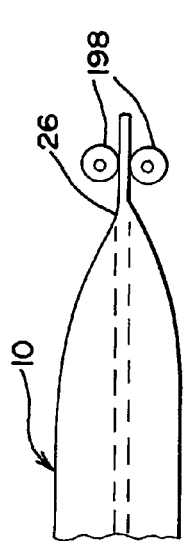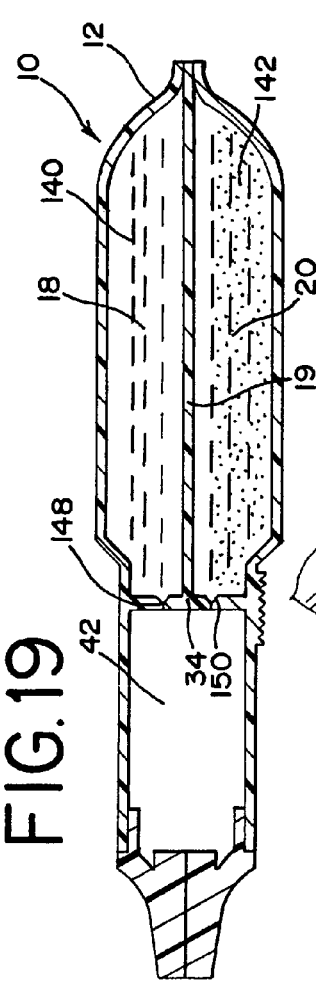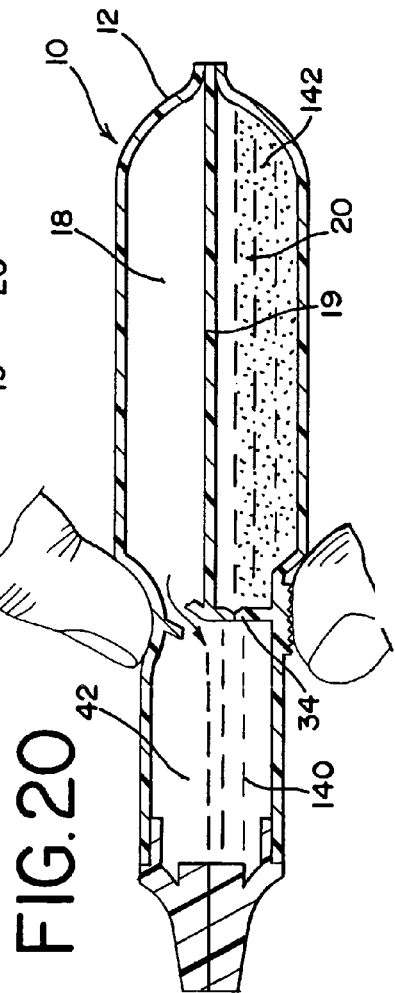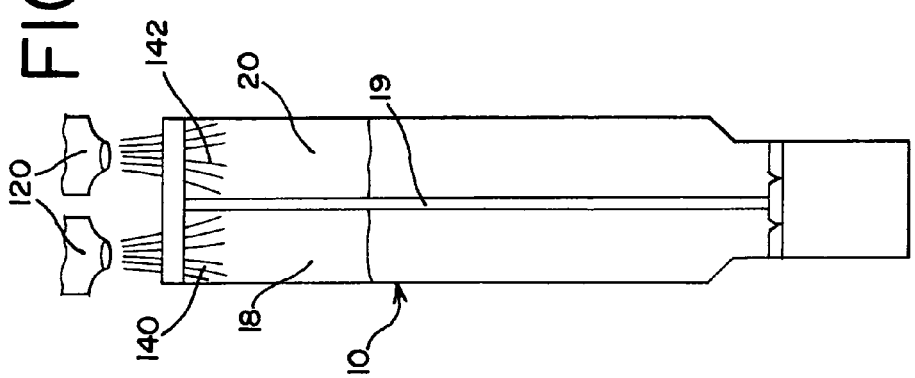

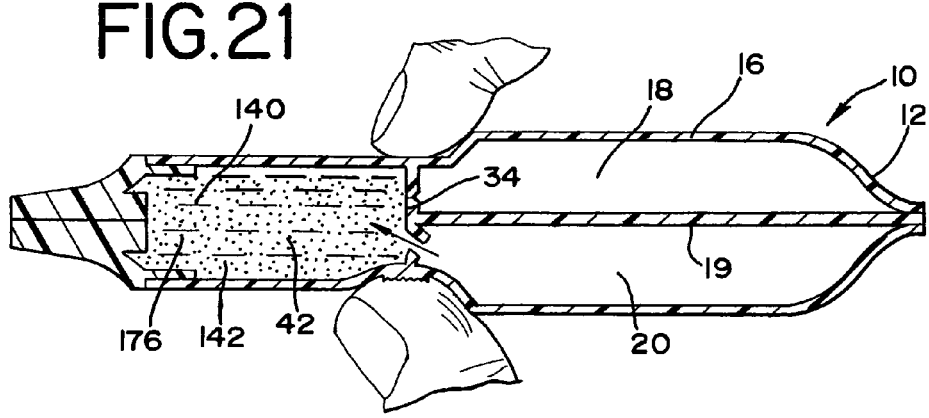
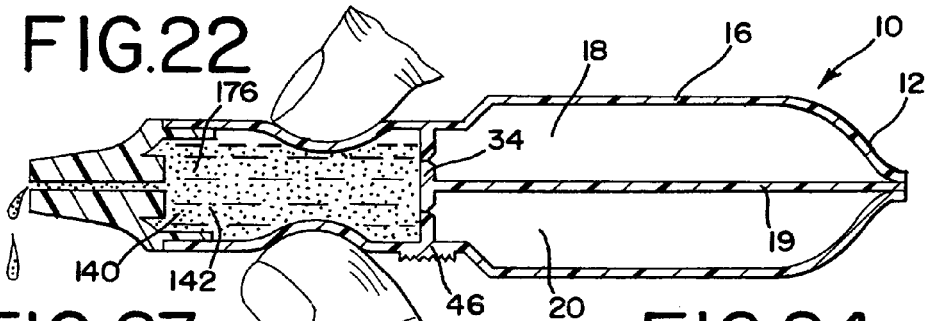
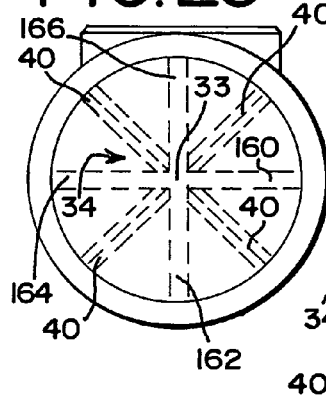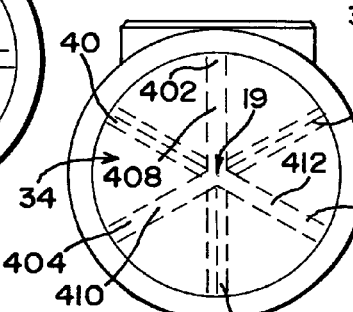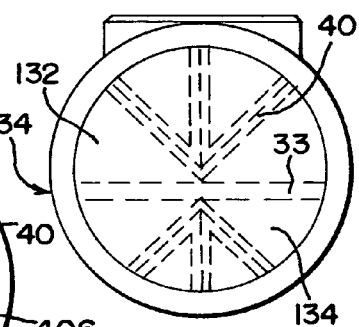
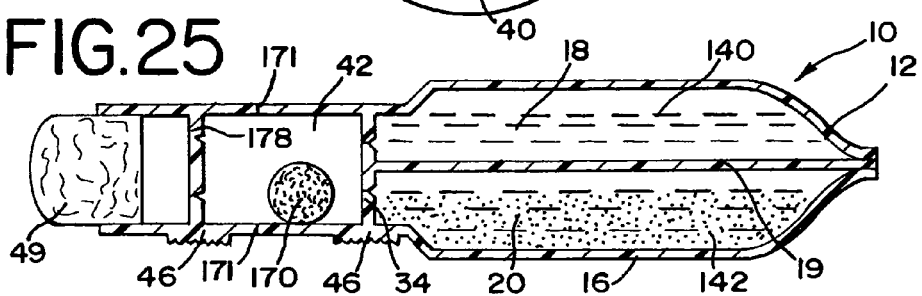

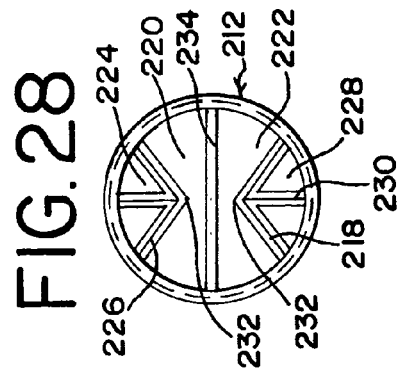
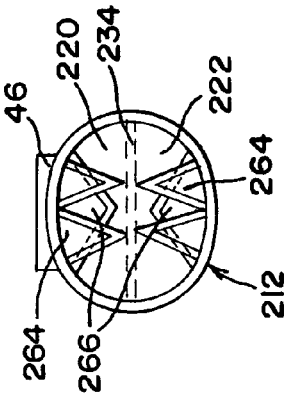
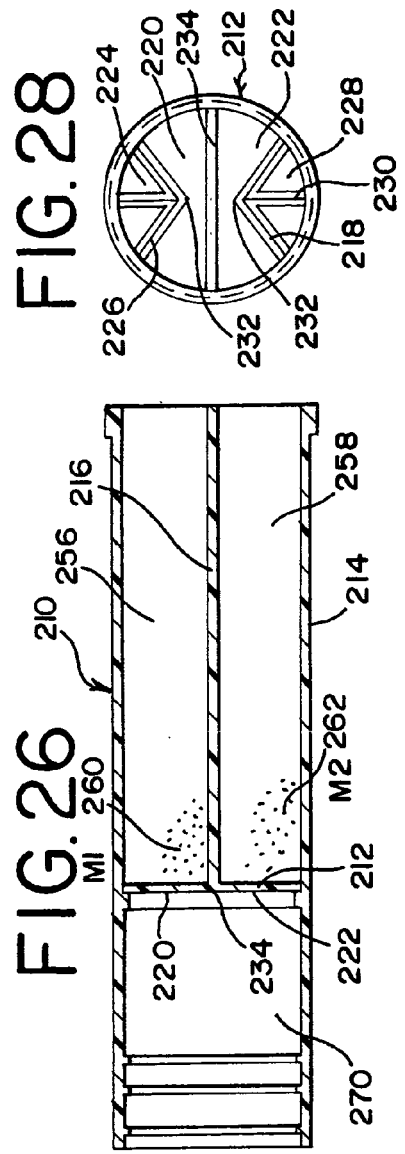
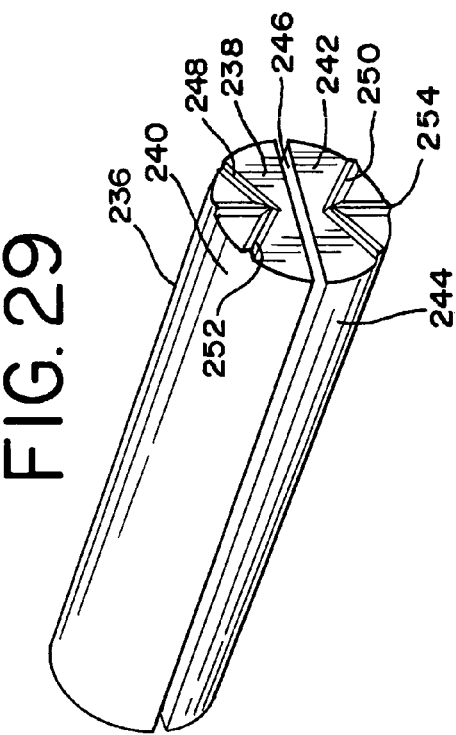
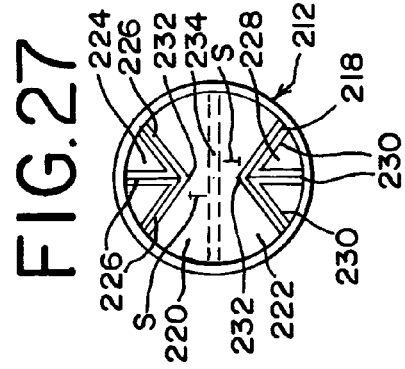

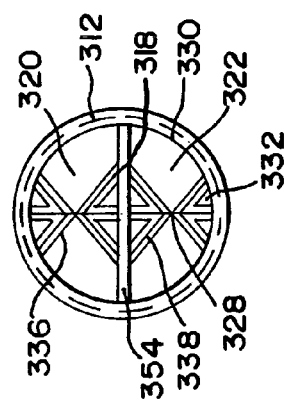
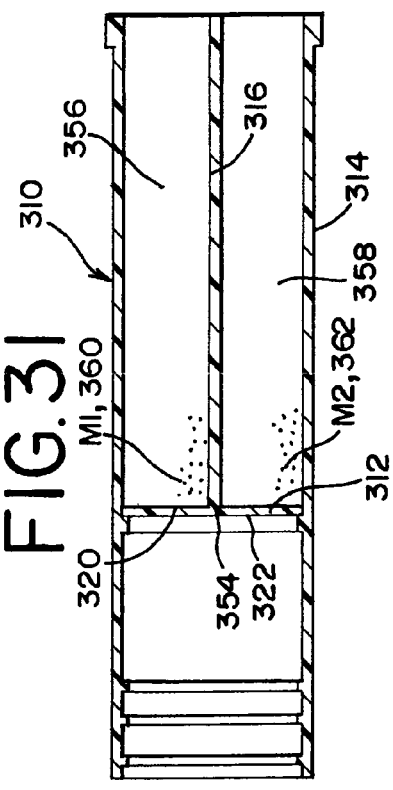
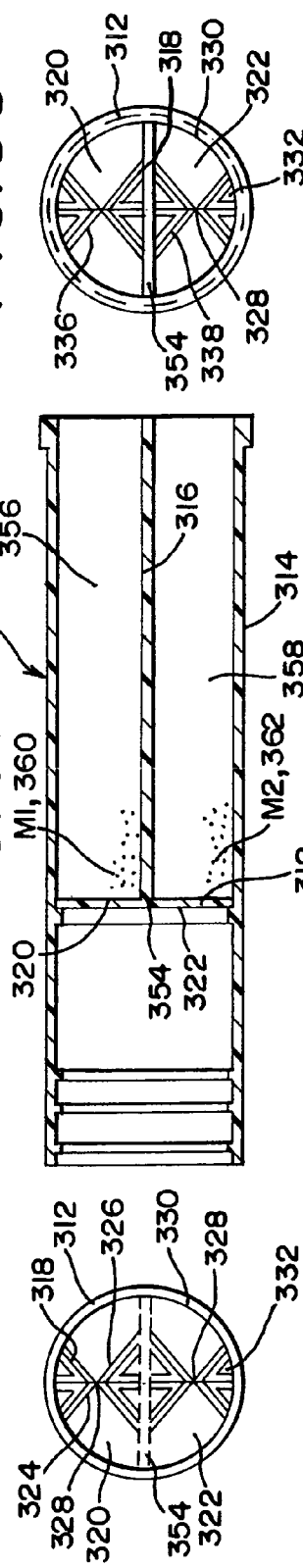
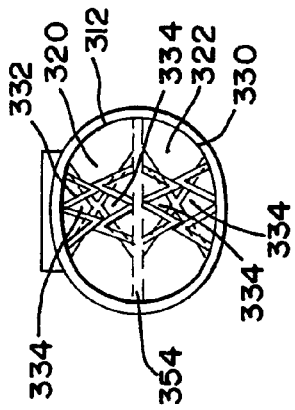
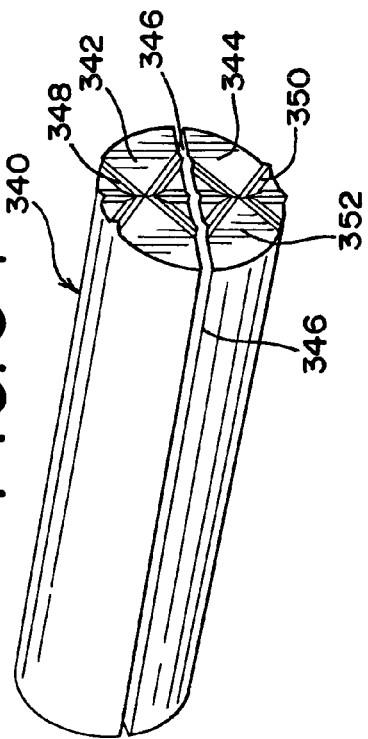

MULTI-CHAMBERED DISPENSER AND PROCESS

CROSS-REFERENCE TO RELATED APPLICATIONS

None.

FEDERALLY SPONSORED RESEARCH OR DEVELOPMENT

None.

TECHNICAL FIELD

The invention relates generally to a dispenser for a flowable material or substance and more particularly, to a multi-chambered dispenser wherein multiple flowable substances can be separately stored and dispensed as desired.

BACKGROUND OF THE INVENTION

Containers capable of dispensing contents stored in the containers are known in the art. In certain applications, it is desired to mix separately contained materials. Containers may be constructed such that the materials are stored in separate compartments and then mixed together at a desired time. The resulting mixture is then dispensed from the container. The separately stored contents can also be dispensed separately as desired.

While such containers, according to the prior art, provide a number of advantageous features, they nevertheless have certain limitations. The present invention is provided to overcome certain of these limitations and other drawbacks of the prior art, and to provide new features not heretofore available. A full discussion of the features and advantages of the present invention is deferred to the following detailed description, which proceeds with reference to the accompanying drawings.

SUMMARY OF THE INVENTION

The present invention provides a multi-chambered dispenser for dispensing flowable materials. In one preferred embodiment, multiple flowable substances can be separately stored in the dispenser, mixed at a desired time, and then dispensed from the dispenser. The flowable materials can also be dispensed separately as desired by the user.

According to a first aspect of the invention, a dispenser is provided for dispensing flowable materials. The dispenser comprises a container having an outer wall, a dividing wall, and a membrane operably connected to define a first chamber and a second chamber. The first chamber is configured to contain a first flowable material M1 and the second chamber is configured to contain a second flowable material M2. The membrane has a first section with a first rupturable member and a second section with a second rupturable member, wherein the first section is separated from the second section by a non-rupturable member.

According to another aspect of the invention, the membrane of the dispenser has a first section confronting the first chamber, wherein the first section has a weld seam, and a second section confronting the second chamber, wherein the second section has a weld seam. The first section of the membrane is separated from the second section of the membrane by a non-rupturable member that is operably associated with the dividing wall.

According to another aspect of the invention, a membrane is provided for use in a dispenser having a first chamber configured to hold a first flowable material M1 and a second chamber configured to hold a second flowable material M2. The membrane comprises a first section having a first rupturable member, a second section having a second rupturable member, and a non-rupturable member separating the first and second sections of the membrane.

According to another aspect of the invention, a dispenser is provided comprising a container having an outer wall, a dividing wall, and a membrane operably connected to define a first chamber, a second chamber, and a mixing chamber. The first chamber contains a first flowable material M1 and the second chamber contains a second flowable material M2. The membrane has a first section confronting the first chamber and has a plurality of first weld seams, and the second section confronts the second chamber and has a plurality of second weld seams. The dividing wall has an end connected to the membrane to define a non-rupturable member that separates the first section and the second section. The membrane is positioned in the container such that a mixing chamber is defined at a location adjacent the membrane so that when pressure is applied to the membrane, the pressure causes rupture of the first weld seam and the second weld seam wherein the first flowable material M1 flows past the first section of the membrane and into the mixing chamber and the second flowable material M2 flows past the second section of the membrane and into the mixing chamber. The first flowable material M1 mixes with the second flowable material M2 to form a mixture in which the mixture is dispensed from the mixing chamber.

According to another aspect of the invention, a dispenser is provided comprising a container having an outer wall, a dividing wall, and a membrane operably connected to define a first chamber and a second chamber. The first chamber is configured to contain a first flowable material and the second chamber is configured to contain a second flowable material. The membrane has a first section confronting the first chamber and has a plurality of first weld seams. The membrane also has a second section confronting the second chamber and has a plurality has a second plurality of weld seams. The dividing wall has an end connected to the membrane to define a non-rupturable member that separates the first section and the second section of the membrane. The plurality of weld seams of the first section and the second section converge to a point spaced from the non-rupturable membrane.

According to another aspect of the invention, a dispenser is provided comprising a container having an outer wall, a dividing wall and a membrane operably connected to define a first chamber and a second chamber. The first chamber is configured to contain a first flowable material and the second chamber is configured to contain a second flowable material. The membrane has a first section confronting the first chamber and has a plurality of first weld seams, and the second section confronts the second chamber and has a plurality of second weld seams. The dividing wall has an end connected to the membrane to define a non-rupturable member that separates the first section and the second section. The first plurality of weld seams extends radially from a substantially center point of the first section, and the second plurality of of weld seams extends radially from a substantially center point of the second section.

According to another aspect of the invention, a method for dispensing flowable material from a dispenser is disclosed. The steps for dispensing the material comprise providing a dispenser having a first chamber and a second chamber configured to contain a first flowable material and a second flowable material to be dispensed. The dispenser further has a membrane with a first section having a first rupturable member and a second section having a section rupturable member that seals the chambers. A force is then applied to the dispenser to rupture the membrane to dispense the first flowable material and the second flowable material through the membrane.

According to another aspect of the invention, a method of forming a dispenser for dispensing flowable material is provided. The steps for forming the dispenser comprise providing a mold having a mold cavity to correspond to the exterior surface of the dispenser. The mold cavity also has a first core pin having a length and a second core pin having a length. The core pins correspond to the interior of the surface of the dispenser. The first core pin has a first leg and a second leg with an elongated recess between the first leg and the second leg. The first core pin has an end face with a raised structure, and the second core pin has an end face. The first core pin is inserted into the mold cavity in which a first space is maintained between the mold and the length of the first core pin. The second core pin is inserted into the mold cavity wherein a second space is maintained between the mold and the length of the second core pin. The first core pin end face confronts, in spaced relation, the second core pin end face to define a membrane space wherein the raised structure is spaced from the second core pin end face to define an interface area and wherein the elongated recess defines a dividing wall and a non-rupturable member. The steps also comprise injecting a thermoplastic material into the mold wherein the material flows into the first space, second space, membrane space and elongated recess. The material flowing into the membrane space flows on opposite sides of the raised structure and elongated recess and substantially abuts at the interface area to define a weld seam, the dividing wall, and the non-rupturable member. The steps also comprise removing the first and second core pins and removing the molded dispenser from the mold.

Other features and advantages of the invention will be apparent from the following specification taken in conjunction with the following drawings.

BRIEF DESCRIPTION OF THE DRAWINGS

To understand the present invention, it will now be described by way of example, with reference to the accompanying drawings in which:

FIG. 1 is a perspective view of a dispenser according to the present invention;

FIG. 2 is a top plan view of the dispenser of FIG. 1 prior to sealing a distal end of the dispenser;

FIG. 3 is a cross-sectional view of the dispenser taken along lines 3-3 in FIG. 2;

FIG. 4 is an enlarged partial cross-sectional view of a membrane taken of the area indicated in FIG. 3;

FIG. 10 is a partial elevation view of the dispenser supporting a swab assembly;

FIG. 11 is a partial elevation view of the dispenser supporting a dropper assembly;

FIG. 12 is a partial elevation view of the dispenser supporting a brush assembly;

FIG. 13 is a partial elevation view of the dispenser supporting a roller assembly;

FIG. 14 is a perspective view of a core pin having an end face with a raised structure;

FIG. 15 is a schematic cross-sectional view of a mold and a portion of the material for forming the dispenser;

FIG. 17 is a schematic view of the dispenser being filled with flowable substances by a filling apparatus;

FIG. 18 is a partial schematic view of a sealing apparatus for sealing a distal end of the dispenser to contain the flowable substances;

FIG. 19 is a cross-sectional view of the dispenser of the present invention holding two flowable substances;

FIG. 20 is a cross-sectional view of the dispenser showing a user rupturing a first section of a membrane of the dispenser;

FIG. 21 is a cross-sectional view of the dispenser showing the user rupturing a second section of the membrane of the dispenser shown in FIG. 20, wherein a first flowable substance M1 mixes with a second flowable substance M2 to form a mixture;

FIG. 22 is a cross-sectional view of the dispenser shown in FIG. 21 wherein the mixture is dispensed from the dispenser;

FIG. 23 is an end view of an alternative embodiment of the dispenser of the present invention;

FIG. 23A is an end view of an alternative embodiment of the dispenser of the present invention;

FIG. 24 is an end view of an alternative embodiment of the dispenser of the present invention;

FIG. 25 is a cross-sectional view of an alternative embodiment of the dispenser of the present invention showing a second membrane at a third chamber;

FIG. 26 is a cross-sectional view of an alternate embodiment similar to the view of FIG. 3;

FIG. 27 is an end view of the alternate embodiment of the membrane of the dispenser in FIG. 26;

FIG. 28 is an opposite end view of an alternative embodiment of the membrane of the dispenser in FIG. 26;

FIG. 29 is a perspective view of a core pin having an end face with a raised structure used to form the dispenser of FIGS. 26-28;

FIG. 30 is an end view of the membrane of FIGS. 26-28 having forces applied thereto wherein the membrane is fractured along weld seams;

FIG. 31 is a cross-sectional view of an alternate embodiment similar to the view of FIG. 3;

FIG. 32 is an end view of an alternate embodiment of the membrane of the dispenser;

FIG. 33 is an end view of an alternative embodiment of the membrane of the dispenser;

FIG. 34 is a perspective view of a core pin having an end face with a raised structure used to form the dispenser of FIGS. 31-33; and FIG. 35 is an end view of an alternate embodiment of the membrane having forces applied thereto wherein the membrane is fractured along mold lines or weld seams.

DETAILED DESCRIPTION OF THE PREFERRED EMBODIMENT

Figure 5:
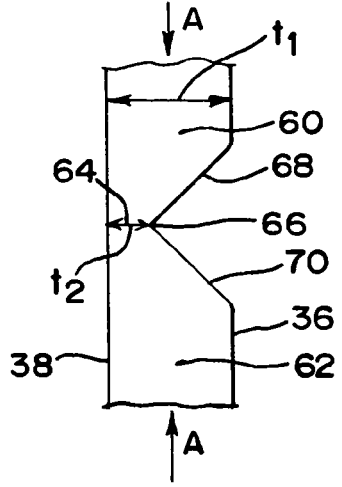
FIG. 5 is another enlarged partial cross-sectional view of the membrane.

While this invention is susceptible of embodiments in many different forms, there are shown in the drawings and will herein be described in detail preferred embodiments of the invention with the understanding that the present disclosure is to be considered as an exemplification of the principles of the invention and is not intended to limit the broad aspect of the invention to the embodiments illustrated.

Referring to the drawings, FIG. 1 discloses a dispenser according to the present invention generally designated by the reference numeral 10. FIGS. 2 and 3 show a container assembly 12 prior to having one end sealed as will be described in greater detail below. As shown in FIGS. 2 and 3, the dispenser 10 generally comprises a container assembly 12 with an elongated axis L having a peripheral wall 16, or outer wall 16. In one preferred embodiment, the container assembly 12 is cylindrical. However, the container assembly 12 can be molded in numerous shapes, including an elliptical shape.

As further shown in FIGS. 2 and 3, the container assembly 12 generally comprises the outer wall 16, a dividing wall 19, and a web 34 or membrane 34. The outer wall 16, the dividing wall 19, and the membrane 34 are preferably integral. As explained in greater detail below, the outer wall 16, the dividing wall 19 and the membrane 34 are operably connected to cooperatively define a first chamber 18 and a second chamber 20 as well as a mixing chamber 42 or third chamber 42. While a three chamber dispenser is one preferred embodiment, more or less chambers can also be defined within the container assembly 12. Generally, to form additional chambers, additional chamber dividing walls are used as shown in FIG. 23 and FIG. 23A. Some different chamber arrangements may include three chamber dividing walls that divide the flowable material containing portion of the dispenser into three chambers, or four chamber dividing walls that divide the flowable material containing portion of the dispenser into four chambers.

As shown in FIGS. 2-4, the first chamber 18, which is adapted to contain a first flowable material M1, 140 (FIG. 19) to be dispensed, has an interior surface 22, an exterior surface 24, and a distal end 26. The second chamber 20, which is adapted to contain a second flowable material M2, 142 (FIG. 19) also has an interior surface 72, an exterior surface 74, and a distal end 76. The third chamber 42 has an interior surface 28, an exterior surface 29 and a proximate end 30. As explained in greater detail below, the distal end 26 of the first chamber 18 and the distal end 76 of the second chamber 20 can be closed by a number of sealing methods, including heat or adhesive sealing. Alternatively, the distal ends 26 and 76 can receive a cap to close the first and second chambers 18, 20. When the distal ends 26 and 76 are sealed, and in cooperation with the membrane 34, the first chamber 18 and second chamber 20 are closed chambers for holding flowable materials such as a two part liquid medicinal fluid. As also shown in FIG. 3, if desired, the container 12 can be necked down wherein the third chamber 42 has a smaller diameter than the diameter of the combined first and second chambers 18, 20. It is understood that the chambers can be sized as desired for various applications.

The chamber dividing wall 19 is positioned in between the first chamber 18 and the second chamber 20 as shown in FIG. 3, and is a preferably planar member. The chamber dividing wall 19 has a sufficient thickness to divide and separate the chambers. The first and second chambers 18, 20 can vary in length as desired. The chamber dividing wall 19 divides the first chamber 18 and the second chamber 20, and preferably joins to the membrane 34 at the membrane center point that defines a non-rupturable member 33 to be described further below. While the dividing wall 19 extends substantially the entire longitudinal length of the container, it is understood that the dividing wall 19 can extend past the outer wall 16 of the container as shown schematically in FIG. 3. This extended portion can be used by automation machinery used in the filling process of the dispenser 10. The dividing wall 19 divides the container assembly 12 evenly along its longitudinal axis, making the first chamber 18 and the second chamber 20 generally of equal size. However, in some embodiments, as shown in FIG. 24, the chamber dividing wall 19 does not bisect the membrane 34 into equal sections, and rather forms a first chamber and second chamber of different sizes and volumes.

Figure 6:
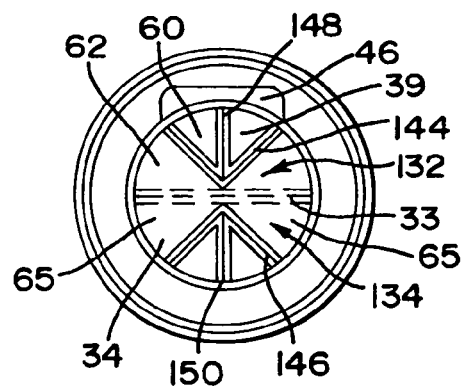
FIG. 6 is an end view of the membrane of the dispenser.

As shown in FIGS. 3-7, the chamber dividing wall 19 has a proximate end 31 that joins the membrane 34 and is preferably integral with the membrane 34 to define the non-rupturable member 33. In addition, the interface between the proximate end 31 of the dividing wall 19 and the membrane 34 defines the non-rupturable member 33. The non-rupturable member 33 is operably associated with the dividing wall 19. The non-rupturable member 33 of the membrane 34 extends across the diameter of the membrane 34 and is positioned at the center point of the membrane 34. The non-rupturable member 33 defines or separates a first section 132 of the membrane 34 having a first rupturable member 144, and a second section 134 of the membrane 34 having a second rupturable member 146. As shown in FIGS. 3 and 6, the membrane 34 includes the first section 132 that confronts and seals the first chamber 18 and the second section 134 that confronts and seals the second chamber 20. The division of the first section 132 of the membrane 34 from the second section 134 is the non-rupturable chamber dividing wall 19 at the non-rupturable member 33 which divides the first chamber 18 from the second chamber 20.

Figure 7:
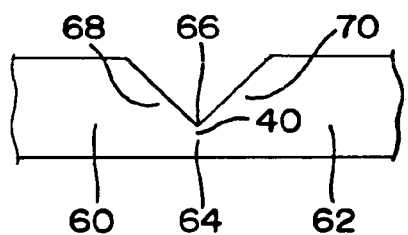
FIG. 7 is a cross-sectional view of a mold line or weld seam taken along lines 7-7 of FIG. 6.

As further shown in FIG. 6, the membrane 34 contains a plurality of rupturable members preferably in the form of weld seams 40, which can be arranged in a number of configurations including but not limited to a cross, star, or asterisk. At least one weld seam 40 is located on each of the first section 132 and second section 134 of the membrane 34. For example, in one preferred embodiment the first section 132 has the first rupturable member 144 that is a first weld seam 148, and the second section 134 has the second rupturable member 146 that is a second weld seam 150. It is understood, further, that the benefits of the invention can be realized with a single weld seam 40, in each of the membrane sections 132, 134, formed from a pair of mold segments abutting one another. In a preferred embodiment, the weld seams 40 are collectively arranged in an asterisk configuration wherein the membrane has a pie-shape. As shown in FIGS. 5 and 7, adjacent mold segments 60, 62 from an injection molding process abut with one another to form the weld seams 40. Due to the configuration of the mold to be described below, the weld seams 40 are formed to have a lesser thickness t2 than the membrane thickness t1. As further shown in FIG. 6, the plurality of weld seams 40 extend radially from substantially a midpoint of the non-rupturable member 33 on the membrane 34 completely to an outer edge of the membrane 34, and to the interior surface of the container assembly 12. It is understood, however, that the weld seams 40 do not need to extend to the outer edge of the membrane 34. It is also understood that the weld seams 40 of the first section 132 do not extend across the non-rupturable member 33 into the second section 134. It is also understood that the weld seams 40 of the second section 134 do not extend across the non-rupturable member 33 into the first section 132. Thus, the non-rupturable member 33 separates the first weld seams 148 from the second weld seams 150. While a membrane containing weld seams 40 is preferred, it is understood that the rupturable members can take other forms including frangible members or members formed by other processes, such as scoring.

The membrane 34 formed is similar to the membrane structure disclosed in U.S. Pat. No. 6,641,319, which is incorporated herein by reference. In a most preferred embodiment, the membrane 34 has eight mold segments; four mold segments are located in the first section 132 and four mold segments are located in the second section 134. Each section 132 and 134 has at least a pair of mold segments 60, 62. The four mold segments cooperate wherein adjacent mold segments abut at three separate interface areas 64 to form three weld seams 148 in the first section 132 and three weld seams 150 in the second section 134. As shown in FIG. 15, the process is controlled such that the adjacent mold segments 60, 62 each meet at the separate interface areas 64. Each weld seam 40 has a thickness less than the thicknesses of the segments. The thicknesses of the mold segments are considered to be the membrane thickness t1 (FIGS. 5 and 7).

Compression of the container 12, such as by finger pressure, causes the membrane 34 to break, rupture, or fracture only along the radial depressions or weld seams 40 forming a series of finger-like projections 39 which are displaced in overlapping fashion (FIG. 9) to create membrane openings 41 for release of the material from the first chamber 18 and the second chamber 20 into the third chamber 42. Since the projections 39 are "pie-shaped" and widest at their outer edges 37, the center section of the web 34 breaks open the widest. The amount of material that can be dispensed through the web 34 is controlled by the degree of the opening 41. The size of the opening 41 is controlled by the configuration of the weld seams 40 and the pressure of the fingers of the user pressing on the container assembly 12 to assert pressure on the web 34. Rupturing of the membrane 34 will be described in greater detail below. The resiliency of the material of the dispenser 10 allows the membrane 34 to return substantially to a closed position when force is removed from the dispenser 10.

As further shown in FIGS. 3-7, the web 34, or membrane 34, partitions the container assembly 12 to separate the first and second chambers 18, 20 from the third chamber 42. Although FIG. 3 shows the membrane 34 closer to the proximate end 30 than the distal end 26, the placement of the membrane 34 is a function of the desired volume capacity of the respective chambers. As such, the membrane 34 could be located at numerous locations in the container assembly 12. In one embodiment, the membrane 34 could be positioned at an end of the dispenser 10 whereby the mixing chamber 42 is eliminated.

As shown in FIGS. 3 and 4, the membrane 34 has a first surface 36 and a second surface 38. The first surface 36 faces towards the first and second chambers 18, 20, while the second surface 38 faces towards with the third chamber 42. The second surface 38 is substantially planar. The first surface 36, however, has a plurality of bands thereon formed by the weld seams 40. Also in one preferred embodiment, the membrane 34 is disposed substantially transverse to the elongated axis L of the container assembly 12. As will be described in greater detail below, and as generally shown in FIGS. 5-6, and 14-15, a first segment 60 of injected molded material abuts a second segment 62 of injected molded material to form the weld seam 40. As can be further seen in FIG. 5, the membrane 34 has a base thickness "t1" between the first membrane surface 36 and the second membrane surface 38. The thickness t1 is generally referred to as the membrane thickness. The weld seam 40 has a thickness t2 that is less than the membrane thickness t1. This facilitates rupture of the membrane 34 as described below. The first mold segment 60 and the second mold segment 62 abut to form the weld seam 40. During the molding process, the mold segments 62, 64 move toward the interface area 64 in the directions of arrows A (FIG. 5). Furthermore, the mold segments 60, 62 meet substantially at the interface area 64 at the lesser thickness t2. This forms the weld seam 40 at the lesser thickness facilitating rupture of the membrane 34. If the mold segments 60, 62 did not meet at the interface area 64 but, for example, substantially further to either side of the interface area 64, the weld seam 40 would be too thick and would not be able to rupture. Whichever mold segment 60, 62 moved past the interface area 64, the segment would merely flex and not rupture as desired. Thus, as described below, the molding process is controlled to insure that the mold segments 60, 62 abut substantially at the interface area 64 to form the weld seam 40 having a thickness t2 less than the membrane thickness t1. In addition, the mold and associated components are configured and the molding process controlled such that a weld seam is not formed at the non-rupturable member 33.

Explained somewhat differently, the first surface 36 of the membrane 34 has a channel 66 formed therein (FIG. 7). The weld seam 40 confronts the channel 66. The channel is formed by a first wall 68 adjoining a second wall 70. In a preferred embodiment, the first wall 68 adjoins the second wall 70 at substantially a 90 degree angle. Acute angles or obtuse angles are also possible. Thus, in one preferred embodiment, the channels are V-shaped.

Figure 9:
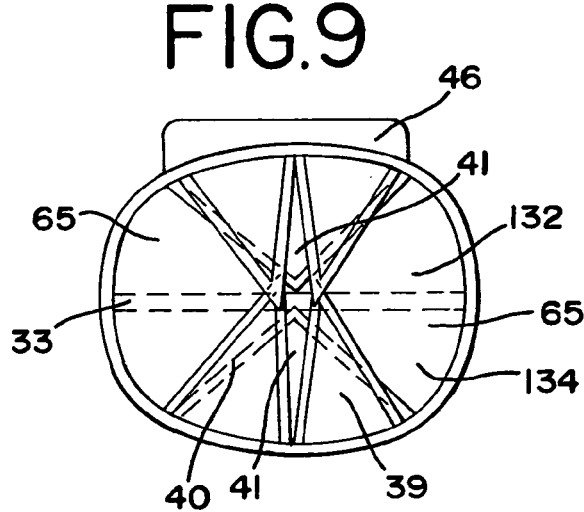
FIG. 9 is an end view of the membrane having forces applied thereto wherein the membrane is fractured along mold lines or weld seams.
Figure 16A:
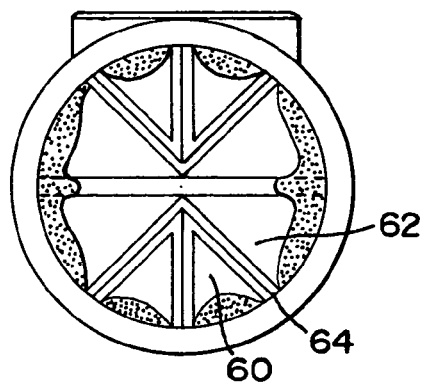
FIG. 16a-16f are a series of views showing the injection molding process of the membrane wherein adjacent mold segments abut to form mold lines or weld seams.
Figure 16B:
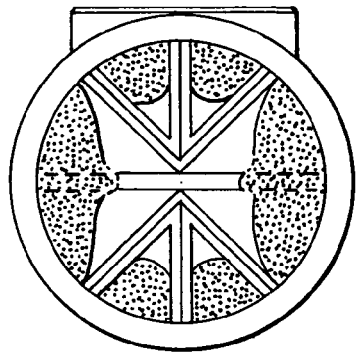
Figure 16C:
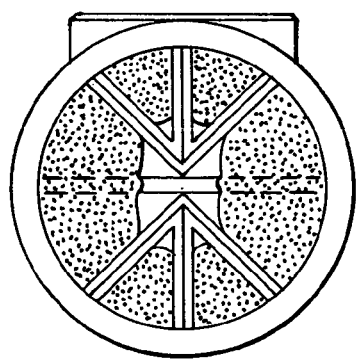
Figure 16D:
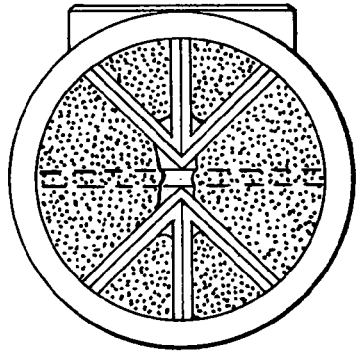
Figure 16E:
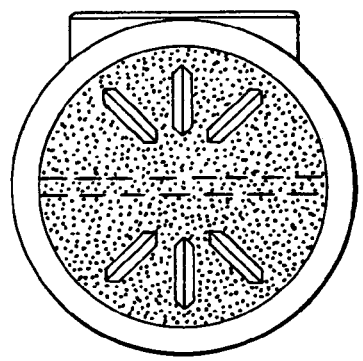
Figure 16F:
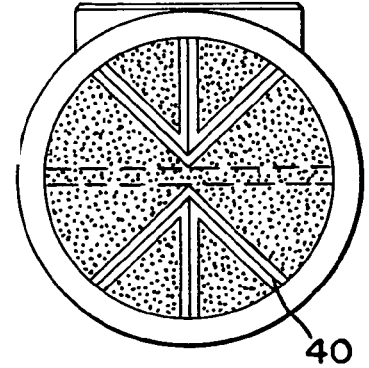

In another preferred embodiment, the membrane 34 forms six narrow spokes of substantially uniform width extending from substantially the center of the membrane 34 to the interior surface 22,28 of the container assembly 12. Each spoke extends at a certain angle from the adjacent spokes on either side. As shown in FIGS. 6 and 9, because of the non-rupturable member 33, larger mold segments 65 are formed at opposite sides of the membrane 34. A portion of each larger mold segment 65 makes up a portion of the first section 132, and another portion of each larger molded segment 65 makes up a portion of the second section 134.

As shown in FIGS. 1-2, the exterior surface 28 of the container assembly 12 has an exterior extension 46 to indicate the exact location where force should be applied to rupture the membrane 34. Specifically, the extension 46 is located directly adjacent to the membrane 34. Although the extension 46 is shown as a thumb pad with a plurality of ridges 47, any type of raised area or projection including a button, prong or ring will suffice. In addition, a ring of material could be applied around the perimeter of the container assembly 12 corresponding to the location of the web 34 so that a user would know precisely where to apply finger pressure. An indicia-bearing marking would also be sufficient.

As shown in FIGS. 3 and 4, first chamber 18 and second chamber 20 are separated from the third chamber 42 by the membrane 34. The third chamber 42, or mixing chamber, is where the first flowable material M1 140 and second flowable material M2,142 combine to form a mixture 176 (FIG. 22) to be dispensed. While the membrane 34 that separates the third chamber 42 and first and second chambers 18, 20 can have a weld seam 40, it is also understood that the third chamber 42 could also have a second membrane 178 as shown in FIG. 25 that also has a weld seam 40. In one preferred embodiment, the second member 34 may be separately attached to the container 12 to close the third chamber 42. Materials can be dispensed from the first and second chambers 18 and 20, and remain in the third chamber 42 until the second membrane 178 of the third chamber 42 is ruptured. This allows the materials time to react with one another before dispensing from the container 12. Additionally, it is understood that a third material or substance such as a pellet 170 could be located within the third chamber 42 so that upon rupturing of the membrane 34, the first and second flowable materials 140 and 142 can dispense into the third chamber 42 and react with the pellet 170 before finally dispensing from the container 12. The embodiment of FIG. 25 will be discussed in greater detail below.

Figure 8:
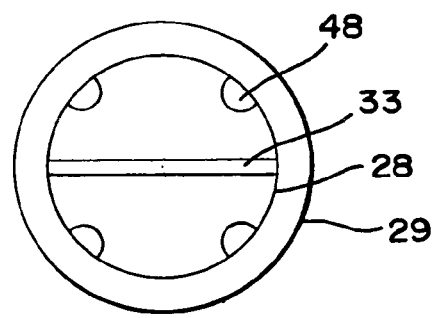
FIG. 8 is a schematic view of an alternative embodiment of the dispenser of the present invention.

As shown in FIGS. 3 and 4, the interior surface 28 of the third chamber, may include ribs 48. In one preferred embodiment, the ribs 48 may take the form of circumferential ribs 172. As shown in an alternative embodiment of FIG. 8, the interior surface 28 of the third chamber 42 has a plurality of longitudinal ribs 48 that extend longitudinally along the interior surface 28. The ribs 48 are thus oriented axially in the third chamber 42 and can be of varying length. The ribs 48 could be shortened and extend radially inwardly. The ribs 48 secure different applicators 44, such as a swab 49 (FIG. 10) or dropper 50 (FIG. 11), a brush 51 assembly (FIG. 12), or a roller 53 assembly (FIG. 13) which can be used to apply the dispensed liquid or solid flowable material. The different applicators form an interference fit with the ribs 48. The different applicators 44 are in communication with the third chamber 42 as shown in FIGS. 10-13.

As further shown in FIG. 10 the swab 49 engages the inner surface 28 of the third chamber. Once the membrane 34 is fractured as described, the swab 49 receives and absorbs the materials M1 and M2 as they are dispensed from the first and second chambers 18, 20 and mixed into the third chamber 42. The swab 49 has a contact surface that is used to dab a desired area such as a skin surface having an insect bite. The dispenser 10 can be inverted and squeezed until the swab 49 surface is wet. The dispenser 10 can then be held in a vertical position with the swab 49 pointed upwardly. Alternatively, the swab 49 can be made of a material of relatively large porosity for passing droplets through the swab 49 by gravity and for dispensing droplets from its exterior surface. The swab 49 can be made of polyester, laminated foamed plastic, cotton or the like.

FIG. 11 shows the dispenser 10 having a dropper attachment 50. The third chamber 42 has a dropper 50 attached thereto. The dropper 50 has an elongated spout 52 with a passageway 54 for dispensing droplets of the mixed M1 and M2 materials. The dropper 50 has a cup-like portion 56 that overlaps a portion of the outer surface 29 of the third chamber 42. Once the membrane 34 is ruptured as described and materials M1 and M2 pass from the first and second chambers 18, 20 to the third chamber 42, droplets of the mixed M1 and M2 materials can be dispensed through the spout 52. The dispenser 10 can be similarly manipulated to dispense the flowable materials M1, M2 using the different applications of FIGS. 11-13.

In a preferred embodiment, the dispenser 10 is made of a transparent, flexible thermoplastic material. The preferred plastic material is polyethylene or polypropylene but a number of other plastic materials can be used. For example, low-density polyethylene, polyvinyl chloride or nylon copolymers can be used. In a preferred embodiment, a mixture of polypropylene and polyethylene copolymer or thermoplastic olefin elastomer is used. In another preferred embodiment, a mixture of polypropylene and Flexomer®, available from Union Carbide, is utilized. It is essential that the dispenser be made of material which is flexible enough to allow sufficient force to rupture the membrane 34. Also, in a preferred embodiment, the dispenser is a one-piece integrally molded member.

The preferred dispenser 10 has a length of about 1.5 to about 3.0 inches, although larger containers can be utilized, with 2 to about 2.5 inches being preferred. The outside diameter of the container assembly is about 0.30 to about 1.0 inches.

The exterior extension 46 is preferably about 0.10 to about 0.50 inches in width and about 0.010 to 0.125 inches thick. The third chamber 42 is preferably about 0.20 to about 1.5 inches and preferably 0.75 inches in length. The membrane 34 preferably has a thickness of about 0.02 to about 0.0625 inches. The weld seams 40 have a preferable thickness of about 0.003 to about 0.008 inches and preferably about 0.005 inches. The above dimensions can be varied depending upon overall dispenser size.

The method of making the dispenser 10 is generally illustrated in FIGS. 14-16 and is similar to the process described in U.S. Pat. No. 6,641,319. The dispenser 10 is produced in a single molding operation thus providing a one-piece injected-molded part. As shown in FIG. 15, a mold 80 is provided having a mold cavity 82 therein. The mold cavity 82 is dimensioned to correspond to the exterior surface of the dispenser 10. A first core pin 84 and a second core pin 86 are provided. A first core pin 84 (FIG. 14) has a first leg 126 and a second leg 128 separated by a longitudinal slot 124 or elongated recess 124. The first leg 126 has a first raised structure 90 and the second leg 128 has a second raised structure 130. Each raised structure 90 and 130 could be different. The core pin 84 is dimensioned to correspond to the interior surface of the dispenser 10. It is understood that the core pin could have a shoulder to form the tapered portion, or necked-down portion of the dispenser 10. Alternatively, the core pin could have a constant diameter if there is to be no tapered portion (different core pin options shown in FIGS. 14-15).

As shown in FIG. 15, the second core pin 86 has a generally planar end face 100. However, the first core pin 84 has an end face 88 on the first leg 126 and an end face 89 on the second leg 128 having the raised structures 90, 130 thereon. The raised structure 90, 130 is in the form of a ridge 92. The ridge 92 is what provides for the depressions or weld seams 40 at the certain thickness in the membrane 34. In a preferred embodiment, the ridge has a first wall 94 adjoining a second wall 96 to form a line 98. The ridges on both end faces 88, 89 are generally the same, although they can be different in alternative embodiments. Furthermore, in a preferred embodiment, the ridge 92 comprises a plurality of ridges radially extending substantially from a center point of the end faces 88, 89. The ridges define a plurality of membrane segments, or mold gaps 93, between the ridges 92. Thus, it can be understood that the raised structure 90 in the form of the ridges 92 provides the corresponding structure of the membrane 34. Although shown as triangular, the ridges 92 can be formed in a number of shapes, including square or rounded. In addition, the ridges 92 can be arrayed in a multitude of shapes, including a single line, a cross, a star, or an asterisk. Varying the shape of the ridges 92 will affect the shape of the channels 66.

The first leg 126 and the second leg 128 of the first core pin 84 can each be semi-cylindrical in shape. When properly positioned for the molding process the first leg 126 and the second leg 128 have the elongated recess 124 between them. During molding, the longitudinal slot 124, or elongated recess 124 is generally filled with molten material which forms the chamber dividing wall 19 upon cooling. In other embodiments the first and second core pins can each be semi-elliptical or various other shapes. The interface of material between the dividing wall 19 and the membrane 34 defines the non-rupturable member 33.

The first core pin 84 is inserted into the mold 80 with the raised structure 90 facing into the mold cavity 82. A first space 104 is maintained between the mold 80 and the length of the first core pin 84. The second core pin 86 is also inserted into the mold cavity 82 wherein a second space 106 is maintained between the mold 80 and the second core pin 86. The core pins 84, 86 are generally axially aligned wherein the end faces 88, 89 of the first core pin 84 confronts the end face 100 of the second core pin 86 in spaced relation. Thus, a membrane space 108 is defined between the respective end faces 88, 89 and 100 of the core pins 84 and 86. The longitudinal slot 124 is defined between the first leg 126 and the second leg 128 of core pin 84. End plates 110, 112 are installed on end portions of the mold 80 to completely close the mold. An exterior extension cavity 117 is located on the surface of the mold 80 and adjacent to a membrane space 108.

As shown in FIG. 15, molten thermoplastic material is injected into the mold cavity 82 through an inlet 114. The material flows into the first space 104, second space 106, membrane space 108, and elongated recess 124. The plastic injection is controlled such that the plastic enters the membrane space 108 simultaneously in the circumferential direction. The raised structures 90 and 130 separate the material into separate mold segments 60, 62 that flow into the mold gaps. As shown in FIGS. 15 and 16, the mold segments 60, 62 flow first into the wider portions of the mold gaps 93 as this is the area of least resistance. The material continues to flow into the membrane space 108 and then the adjacent mold segments 60, 62 abut at the interface area 64 to form the weld seams 40. As can be appreciated from FIG. 15, the weld seams 40 have a lesser thickness than the membrane thickness. The first raised structure 90 of the first leg 126 forms the first weld seam 148, and the second raised structure 130 of the second leg 128 forms the second weld seam 150. During this process, air is vented from the mold cavity 82 as is conventional.

Once the plastic injection is complete, the material is allowed to cool. A cold water cooling system 116 could be utilized wherein cold water is pumped into the mold 80 outside of the cavity 82 if desired. Once cooled, the dispenser 10 can be removed from the mold 80.

As shown in FIG. 17, the dispenser 10 can be passed on to a filling apparatus 120. The dispenser 10 is then filled with flowable materials M1 and M2. As previously discussed, the extended portion of the dividing wall 19 (FIGS. 2 and 3) could be manipulated by automation machinery associated with the filling apparatus 120. As shown in FIG. 18, the distal end 26 of the dispenser 10 is sealed by heat sealing dies 198. The excess end portion can then be cut-off and discarded. It is understood that heat sealing is one preferred seal while other sealing methods could also be utilized.

Thus, a one-piece injection molded dispenser is provided. The one-piece construction provides a more repeatable part and at greater manufacturing efficiency than providing a separate piece that is secured into a container assembly. If desired, however, the membrane 34 could be separately molded and affixed into a container assembly 12. A one-piece molding process, however, is preferred. In addition, because the membrane 34 is molded to have the weld seams, radial depressions, or bands, an additional manufacturing step such as scoring to create a rupturable member is unnecessary. This allows the manufacture of dispensers having relatively small diameters since there is no need to allow sufficient clearance for a scoring tool. In such small configurations, it is difficult to control the scoring operation. By forming the depressions by injection molding, the desired thicknesses can be closely controlled. The membrane 34 also resists rupture from hydraulic pressure while being easily rupturable when forces are applied to the membrane. Also, the construction of the membrane 34 allows for the precise control of material to be dispensed by controlling the amount of force on the membrane 34. It is further understood that the depressions or channels could be formed on both sides of the membrane 34 if desired. In such configuration, however, the ability of the membrane to also function as a check valve is lessened. In a preferred embodiment, however, the membrane has the depressions molded on only one side. It is further understood while certain dimensions are preferred for certain embodiments, dispensers of all sizes having similar relative dimensions can be formed according to the present invention. It is also understood that in certain embodiments of the multi-chambered dispenser, the rupturable member could be other than a weld seam if desired. For example, a scored line could be provided, a frangible seam, or other rupturable member.

FIGS. 19-22 disclose operation of the dispenser 10 after being filled and sealed as shown in FIGS. 17 and 18. In operation, a user applies a selective force F on the dispenser 10 at the exterior extension 46 adjacent to the membrane 34. When sufficient force F is applied, as shown in FIG. 20, lateral pressure is applied to the membrane 34 causing the membrane 34 to shear, rupture or fracture along the weld seams 40. The membrane 34 ruptures only along the weld seams 40 to create the membrane openings 41. Upon rupture of the membrane 34, material passes from the first chamber 18 and the second chamber 20 through the membrane 34 and into the third chamber 42. The material flow rate through the membrane 34 and into the third chamber 42 is controlled by the degree of membrane opening which is directly related to the amount of force F applied to the membrane 34 by the user. Therefore, the user can precisely regulate the flow of material after rupture of the membrane 34. In addition, the membrane 34 can preferably have elastic characteristics wherein when force F is removed, the membrane 34 returns substantially to its original position. While the weld seams 40 may be ruptured, the segments 60, 62 can form a close enough fit to prevent material from flowing past the membrane 34 without additional pressure on the material. Thus, the membrane 34 can act as a check valve to prevent unwanted flow of the material back into the chambers 18, 20.

In one preferred embodiment it is understood that a user can apply a selective force F on the dispenser 10 at the exterior extension 46 adjacent to the membrane 34 causing the first section 132 of the membrane 34 to rupture along the first weld seams 148 of the first section 132 of the membrane 34 as shown in FIG. 20. Upon rupture of the first weld seams 148 of the first section 132 of the membrane 34, the first flowable material M1, 140 passes from the first chamber 18 through the first section 132 of the membrane 34 and into the third chamber 42. As a user applies a selective force F at the exterior extension 46 adjacent to the membrane 34, the force causes the second section 134 of the membrane 34 to rupture along the second weld seams 150 of the second section 134 of the membrane 34. Upon rupture of the second weld seams 150 of the second section 134 of the membrane 34, the second flowable material M2, 142 passes from the second chamber 20 through the second section 134 of the membrane 34 and into the third chamber 42 as shown in FIG. 21. The first flowable material M1, 140 and the second flowable material M2, 142 mix within the third chamber 42 to form a mixture 176. As discussed, the elastic characteristics of the membrane 34 allow the membrane 34 to close. The mixture 176 is subsequently dispensed from the third chamber 42 as shown in FIG. 22. As discussed, while FIG. 22 shows a dropper applicator, other applicators could also be used.

Furthermore, if the third chamber 42 has a second membrane 178 for dispensing the mixture 176 as discussed above, it is understood that rupture of the membrane 34 occurs prior to rupturing of the second membrane 178 of the third chamber 42.

In some embodiments, it is desirable to have the first section 132 of the membrane 34 rupture before the second section 134 of the membrane 34. In this embodiment, the thickness t2 at the weld seam 40 on the first section 132 of the membrane 34 is less than the thickness t2 at the weld seam 40 on the second section 134 of the membrane. When pressure is applied to the exterior of the dispenser 10, the first section 132 of the membrane 34 ruptures, and then the second section 134 of the membrane 34 ruptures. Alternatively, pressure could be withdrawn such that only the first section 132 ruptures, leaving the second section 134 intact and to be subsequently ruptured.

As previously discussed, FIGS. 23-24 disclose certain alternative embodiments of the multi-chambered dispenser 10 of the present invention. As can be appreciated from FIG. 23, a mold and associated core pins could be configured such that the dividing wall 19 has a horizontal segment 160 and a vertical segment 162. Interfaces between these dividing walls 160, 162 and the membrane 34 cooperate to form a first non-rupturable member 164 and a second non-rupturable member 166. With such configuration, it will be understood that four distinct chambers are defined in the container with the membrane 34 having four distinct sections. Each membrane section has a weld seam 40 as shown in FIG. 23. It is understood that more or less chambers and membrane sections could be provided by appropriately configuring the mold and core pins. As a further alternative, and as shown in FIG. 23A, it is understood that the dividing wall 19 could take the form of a three-section wall having three segments 402, 404, 406 that converge to a central point. Interfaces between these dividing walls 402, 404, 406 and the membrane 34 cooperate to form three non-rupturable members 408, 410, 412 that also converge to a central point. With this configuration, it will be understood that three distinct chambers are defined in the container with the membrane 34 having three distinct sections. Each membrane section has a weld seam 40 as shown in FIG. 23A. It is further understood that the dividing walls 402, 404, 406 can be positioned at varying angular positions with respect to one another. This allows the respective volumes of the chambers to be varied as desired for particular applications. The membrane sections can be ruptured along the weld seams 40 as desired. FIG. 24 shows that a mold and core pins can be configured such that the dividing wall 19 and non-rupturable member 33 can be positioned off-center. In this configuration the first section 132 of the membrane 34 and the first chamber 18 are larger than the second section 134 of the membrane 34 and the second chamber 20. This is useful when a desired mixture for the dispenser 10 require different volumes of the respective flowable materials M1, M2.

FIG. 25 discloses another alternative embodiment. The multi-chambered dispenser 10 is provided with flowable materials M1, M2 as described above. A second membrane 178, separately molded, is connected proximate a distal end of the mixing chamber 42, generally at connection point 171. The second membrane 178 can be connected via ultrasonic methods, spin welding or heating bonding techniques. The second membrane 178 closes off the mixing chamber 42. A swab 49 or other applicator attachments described above could also be attached to a distal end of the dispenser 10, adjacent the second membrane 178. It is understood that the second membrane 178 is a single section membrane having a plurality of weld seams 40. In operation, the first membrane 34 is ruptured as described above wherein the flowable substances M1 and M2 flow into the mixing chamber 42 to form the mixture 176. When desired, the second membrane 178 can be ruptured in similar fashion wherein the mixture 176 is dispersed from the dispenser 10. As discussed, a reactive agent, such as a pellet 170, can be inserted into the mixing chamber 42 prior to connecting the second membrane 178. A reactive agent would react with the mixture 176 in certain applications such as for testing.

FIGS. 26-30 disclose another alternative embodiment. In some embodiments, it is desirable to have the weld seams 40 of the membrane converge to a point spaced from the non-rupturable member. For instance, FIG. 26 discloses one preferred embodiment in which a multi-chambered dispenser 210 is provided. It is understood that the dispenser 210 shown in FIG. 26 has a similar configuration to the dispenser 10 when sealed such as shown in FIG. 1. As shown in FIG. 26, and discussed above, the dispenser 210 generally includes an outer wall 214, a dividing wall 216 and a membrane 212. The membrane 212 is preferably integral with the outer wall 214 and dividing wall 216 of the dispenser 210 and operably connected to cooperatively define a first chamber 256 and a second chamber 258. The first chamber 256 is configured to hold a first flowable substance M1, 260 (shown schematically) and the second chamber 258 is configured to hold a second flowable substance M2, 262 (shown schematically). The membrane 212 is preferably positioned within the dispenser 210 such that an additional chamber 270 is defined opposite the membrane 212, which represents the mixing chamber 270 as discussed above. It is understood that an open end is defined at the mixing chamber 270, which can receive any one of the applicator assemblies as discussed above including a swab or dropper assembly. It is further understood that the membrane 212 could be positioned at various locations of the outer wall 214 included at a distal end such that no mixing chamber is defined.

As shown in FIGS. 26-28, the membrane 212 has a first section 220 that confronts the first chamber 256 and a second section 222 that confronts the second chamber 258. The dividing wall 216 is connected to the membrane 212 to define a non-rupturable membrane 234 that separates the first section 220 and the second section 222. The non-rupturable member 234 is similar in structure to the non-rupturable member described above. As shown in FIG. 27, the membrane 212 contains a plurality of rupturable members preferably in the form of radial depressions or weld seams 218, similar to the welds seams 40 of FIG. 6 described in greater detail above. The membrane 212 is similar to the membrane structure disclosed in U.S. Pat. No. 6,641,319, which is expressly incorporated by reference herein. At least one weld seam 218 is located on each of the first section 220 and the second section 222 of the membrane 212. FIG. 28 shows, for example, in one preferred embodiment the first section 220 has a first rupturable member 224 that is a first weld seam 226, and the second section 222 has a second rupturable member 228 that is a second weld seam 230. It is further understood that the benefits of the invention can be realized with a single weld seam 218, in each of the membrane sections 220 and 222 formed from a pair of mold segments abutting one another. As discussed above and shown in FIGS. 5 and 7, adjacent mold segments 60, 62 from an injection molding process abut one another to form the weld seams 218. Due to the configuration of the mold, the weld seams 218 are formed to have a lesser thickness t2 than the membrane thickness t1. FIG. 27 shows the plurality of weld seams 218 extending radially from substantially a midpoint 232 located a distance S spaced away from the non-rupturable membrane 234, to an outer edge of the membrane 212. In each membrane section, the weld seams 218 extend generally from a point spaced away from the non-rupturable member 234, to proximate a periphery of the membrane. The distance S can vary as desired. In one preferred embodiment, it is understood that the weld seams 218 do not contact the non-rupturable member 234, nor do the weld seams 218 from one section extend across the non-rupturable member 234 into the other section. In a preferred embodiment shown in FIGS. 27-28, each membrane section has three weld seams 218 that converge to the point 232.

As discussed above, the dispenser 210 is filled wherein the first chamber 256 is filled with the first flowable substance M1,260 and the second chamber 258 is filled with the second flowable substance M2,262. The distal end of the dispenser 210 is sealed such as shown in FIG. 1. The dispenser 210 is activated similarly as described above. Compression of the container 210 at the membrane 212, such as by finger pressure, causes the membrane 212 to break, rupture, or fractionate only along the rupturable members 218 forming a series of finger-like projections 264 which are displaced in overlapping fashion (FIG. 30) to create membrane openings 266 for release of the material from the dispenser 210. As discussed above, the order of rupture of the membrane sections can be controlled based on the forming process for the dispenser 210. Similar to the dispenser 10 as disclosed in FIGS. 19-22, a user applies a force generally at the membrane 212. The weld seams 218,226 on the first section 220 of the membrane 212 will fracture or rupture creating the opening 266 (FIG. 30) wherein the first flowable substance M1,260 will pass through the opening 266 and into the mixing chamber 270. The weld seams 218,230 on the second section 222 of the membrane 212 will also fracture or rupture creating the opening 266 (FIG. 30) wherein the second flowable substance M2,262 will pass through the opening 266 and into the mixing chamber 270. It is understood that the weld seams 218, 230 on the second section 222 can be designed to fracture either simultaneously or after the weld seams 226 on the first section 220. It is further understood that the non-rupturable member 234 separates the membrane 212 and also the openings 266 in the first section 220 and the second section 222 of the membrane 212. Because the weld seams 218 converge to the point 232 spaced from the non-rupturable member 234, the openings 266 are also spaced from the non-rupturable member 234 or spaced generally from a center of the membrane 212. The flowable substances M1,M2 mix in the mixing chamber 270 wherein the resulting mixture can then be dispensed from the dispenser 210 as desired by the user. It is further understood that when force is removed from the dispenser 210, the membrane 212 substantially returns to its original position wherein the openings 266 substantially close to prevent further flow therethrough.

The method of making the dispenser is generally understood from FIG. 29, and the previous discussion of the method above and in FIGS. 14-16. As mentioned above, the dispenser 210 is made using a first core pin 84 and a second core pin 86. The core pins are dimensioned to correspond to the interior surface of the dispenser 210. As shown in FIG. 29, the first core pin 236 of one preferred embodiment is shown. The first core pin 236 has a first leg 240 and a second leg 244 separated by a longitudinal slot 246. The first leg 240 has a first raised structure 248 and the second leg 242 has a second raised structure 250. Each raised structure 248 and 250 could be either the same or different. The first core pin 236 has an end face 238 on the first leg 240 and an end face 242 on the second leg 244 having the raised structures 248, 250 thereon. In this embodiment, the first leg 240 is not connected to the second leg 244 allowing for enhanced control over the molding process. It is further understood that the raised structures 248, 250 correspond to the plurality of first weld seams 226 and the plurality of second weld seams 230 respectively. Thus, the raised structure 248 has a plurality of ridges that converge to a point spaced from the longitudinal slot 246. Similarly, the raised structure 250 has a plurality of ridges that converge to a point spaced from the longitudinal slot 246. It is understood that the first core pin 236 would be inserted into a mold with a second core pin similar to the configuration as shown in FIGS. 15-16.

FIGS. 31-35 disclose another alternative embodiment. In some embodiments, a membrane with weld seams that extend radially from a substantially center point of the membrane in a section is desirable. For example, FIG. 31 discloses one preferred embodiment in which a multi-chambered dispenser 310 is provided. It is understood that the dispenser 310 shown in FIG. 26 would have a similar configuration to the dispenser 10 when sealed as shown in FIG. 1. As shown in FIG. 31, and discussed above, the dispenser 310 generally includes an outer wall 314, a dividing wall 316 and a membrane 312. The membrane 312 is preferably integral with the outer wall 314 and dividing wall 316 of the dispenser 310 and operably connected to cooperatively define a first chamber 356 and a second chamber 358. The first chamber 356 is configured to hold a first flowable substance M1, 360 and the second chamber 358 is configured to hold a second flowable substance M2, 362. As shown in FIGS. 31-33, the membrane 312 has a first section 320 that confronts the first chamber 364 and a second section 322 that confronts the second chamber 358. The dividing wall 316 is connected to the membrane 312 to define a non-rupturable membrane 354 that separates the first section 320 and the second section 322. The membrane 312 formed is similar to the membrane structure disclosed in U.S. Pat. No. 6,641,319, as previously discussed. As shown in FIG. 32, the membrane 312 has a plurality of rupturable members, or radial depressions 326, in the form of weld seams 318 that extend from substantially a center point 328 in each membrane section. The rupturable members 326 extend from substantially a center point 328 of the membrane sections 320, 322 to an outer edge 330 of the membrane 312 and to the dividing wall 316 and non-rupturable member 354.

FIG. 32 shows, for example, in one preferred embodiment the first section 320 has the first set of radial depressions 326, and the second section 322 has the second rupturable second set of radial depressions 326. FIGS. 32 and 33 show the plurality of welds seams 318 extending radially from a substantially midpoint or centerpoint 328 located at the center of the first section 320 and the second section 322, to the periphery of the membrane 312. FIGS. 32 and 33 also show the plurality of welds seams 318 extending radially from a substantially midpoint 328 located at the center of the first section 320 and the second section 322, to the non-rupturable member 354 or dividing wall 316. In one preferred embodiment, it is understood that the weld seams 318 do not extend across the non-rupturable membrane 354. In one preferred embodiment, each membrane section has a first set of three weld seams 318 extending from the center point 328 towards one direction, and a second set of three weld seams 318 extending from the center point 328 in a generally opposite direction from the first set of weld seams 318.

As discussed above, the dispenser 310 is filled wherein the chambers 356, 358 are respectively filled with the first flowable substance M1,360 and the second flowable substance M2,362. Compression of the container 310 at the membrane 312, such as by finger pressure, causes the membrane 312 to break, rupture, or fractionate only along the rupturable members 318 forming a series of finger-like projections 332 which are displaced in overlapping fashion (FIG. 35) to create membrane openings 334 for release of the material from the dispenser 310. The flowable substances M1,M2 can pass through the membrane openings 334 as discussed above, mix to form a mixture, which can then be dispensed from the dispenser 310 similar to that shown in FIGS. 19-22.

The method of making the dispenser is generally understood from FIG. 34, and the previous discussion above with respect to FIG. 29 and FIGS. 14-16. As mentioned above, the dispenser is made using a core pin 340. The core pin 340 is dimensioned to correspond to the interior surface of the dispenser 310. As shown in FIG. 34, the core pin 340 of one preferred embodiment is shown. The core pin 340 has a first leg 342 and a second leg 344 separated by a longitudinal slot 346. The first leg 342 has a first raised structure 348 and the second leg 344 has a second raised structure 350. Each raised structure 348 and 350 could be either the same or different. The core pin 340 has an end face 352 on the first leg 342 and an end face 352 on the second leg 342 having raised structures 348, 350 thereon that cooperate to form the weld seams 318. The raised structures 348, 350 correspond to the plurality of weld seams 318 on the membrane sections 320, 322. Thus, the first raised structure 348 has a plurality of ridges that extend in opposite directions from substantially a center point of the face of the first leg 342. The second raised structure 350 has a plurality of ridges that extend in opposite directions from substantially a center point of the face of the second leg 344. It is understood that the first core pin 340 would be inserted into a mold with a second core pin similar to the configuration as shown in FIGS. 15-16.

It is understood that the "first" and "second" designations for the dispenser of the present invention can be reversed as desired. It is further understood that the term "outer" when describing the outer wall of the dispenser is a relative term. It is understood that the dispenser of the present invention could be incorporated into other structures that may encompass the outer wall. The outer wall of the dispenser of the present invention, cooperates with the membrane and dividing wall to define the chambers of the dispenser.

It is further understood that the membranes disclosed having the non-rupturable member are the most preferred embodiments of the invention. It is contemplated that the dispenser can be formed having a membrane without a non-rupturable member. In such configuration, the interface between the dividing wall and the membrane can be rupturable wherein the dividing wall can fracture from the membrane providing an additional pathway for the flowable materials in the first chamber and second chamber to mix. Thus, the dividing wall would be spaced away from the membrane. The membrane in such embodiment may be considered to be single section membrane rather than being defined into separate sections by the non-rupturable member. When the membrane is fractured along at least one weld seam, the mixture of the first and second flowable materials can be dispensed through the openings in the membrane.

The dispenser 10 is designed to primarily contain and dispense flowable materials that are fluids. Other flowable materials can also be used. For example, in one embodiment the flowable materials M1, M2 could both be fluids. In another embodiment, the first flowable material M1 could be a liquid, and the second flowable material M2 could be a powder to be mixed with the fluid. Other combinations depending on the use are also permissible. This permits the dispenser 10 to be used in a wide variety of uses, and contain and dispense a large variety of fluids and other flowable substances. The following is a non-exhaustive discussion regarding the many possible uses for the dispenser of the present invention. It is understood that related uses to those described below are also possible with the dispenser.

In one example, the dispenser 10 can be used in a two-part hair care product such as a hair dye kit. A first flowable substance of the hair dye kit can be carried in the first chamber, and a second flowable substance of the hair dye kit can be carried in the second chamber. The membrane is ruptured wherein the two flowable substances can be mixed together to form a mixture or solution. The mixture or solution can then be dispensed from the dispenser onto the hair of a user. In a multitude of other examples, the dispenser 10 can dispense a flowable material or mixture that is an adhesive, epoxy, or sealant, such as an epoxy adhesive, craft glue, non-medical super glue and medical super glue, leak sealant, shoe glue, ceramic epoxy, fish tank sealant, formica repair glue, tire repair patch adhesive, nut/bolt locker, screw tightener/gap filler, super glue remover or goo-b-gone. Also, the dispenser 10 can dispense a flowable material or mixture that is an automotive product, such as a rear view mirror repair kit, a vinyl repair kit, an auto paint touch up kit, a window replacement kit, a scent or air freshener, a windshield wiper blade cleaner, a lock de-icer, a lock lubricant, a liquid car wax, a rubbing compound, a paint scratch remover, a glass/mirror scratch remover, radiator stop-leak, or a penetrating oil. The dispenser 10 can also dispense a flowable material or mixture that is a chemistry material, such as a laboratory chemical, a fish tank treatment, a plant food, a cat litter deodorant, a buffer solution, a rehydration solution of bacteria, a biological stain, a rooting hormone, a colorant dispenser, or disinfectants.

Moreover, the dispenser 10 can dispense a flowable material or mixture that is a cosmetic, fragrance or toiletry, such as nail polish, lip gloss, body cream, body gel, hand sanitizer, cologne, perfume, nail polish remover, liquid soaps, skin moisturizers, tooth whiteners, hotel samples, mineral oils, toothpastes, or mouthwash. The dispenser 10 can also dispense a flowable material or mixture that is an electronics product, such as a cleaning compound, a telephone receiver sanitizer, a keyboard cleaner, a cassette recorder cleaner, audio/video disc cleaner, a mouse cleaner, or a liquid electrical tape. In addition, the dispenser 10 can dispense a flowable material or mixture that is a food product, such as food colorings, coffee flavorings, spices, food additives, drink additives, confections, cake gel, sprinkles, breath drops, condiments, sauces, liquors, alcohol mixes, energy drinks, or herbal teas and drinks. The dispenser 10 can also dispense a flowable material or mixture that is a hair care product, such as hair bleaches, hair streaking agent, hair highlighter, shampoos, hair colorants, conditioners, hair gels, mousse, hair removers, or eyebrow dye. The dispenser 10 can also dispense a flowable material that is a home repair product, such as a caulking compounds or materials, a scratch touch up kit, a stain remover, a furniture repair product, a wood glue, a patch lock, screw anchor, wood tone putty or porcelain touch-up.

In addition, the dispenser 10 can dispense a flowable material or mixture that is a test kit, such as a lead test kit, a drug kit, a radon test kit, a narcotic test kit, a swimming pool test kit (e.g., chlorine, pH, alkalinity etc.), a home water quality tester, a soil test kit, a gas leak detection fluid, or a pregnancy tester. The dispenser 10 can dispense a large variety of lubricants including industrial lubricants, oils, greases, graphite lubricants or a dielectric grease. The dispenser 10 can also dispense a flowable material or mixture that as part of a medical device test kit, such as a culture media, a drug monitoring system, a microbiological reagent, a streptococcus test kit, or a residual disinfectant tester. In addition, the dispenser 10 can dispense a large variety of medicinal products, such as blister medicines, cold sore treatments, insect sting and bit relief products, skin cleaning compounds, tissue markers, topical antimicrobials, topical demulcent, treatments for acne such as acne medications, umbilical area antiseptics, cough medicines, waterless hand sanitizers, toothache remedies, cold medicines and sublingual dosages. Furthermore, the dispenser 10 can dispense a flowable material or mixture that is a novelty product, such as a chemiluminescent light, a Christmas tree scent, a glitter gel, and a face paint. The dispenser 10 can also dispense a variety of paint products such as novelty paints, general paints, paint additives, wood stain samples, caulk, paint mask fluid or paint remover. The dispenser 10 can also dispense a flowable material or mixture that is a personal care product, such as shaving cream or gel, aftershave lotion, skin conditioner, skin cream, skin moisturizer, petroleum jelly, insect repellant, personal lubricant, ear drops, eye drops, nose drops, corn medications, nail fungal medication, aging liquids, acne cream, contact lens cleaner, denture repair kit, finger nail repair kit, liquid soaps, sun screen, lip balm, tanning cream, self-tanning solutions or homeopathic preparations. A large variety of pest control products can be dispensed by the dispenser 10, including insect attractants, pesticides, pet medications, pet insect repellants, pet shampoos, pest sterilizers, insect repellants, lady bug attractant and fly trap attractant. Various safety products can be dispensed through the dispenser 10 including respirator tests and eye wash solution.

The dispenser 10 can also dispense a large variety of stationery or craft products, such as magic markers, glitter gels, glitter markers, glitter glues, gel markers, craft clues, fabric dyes, fabric paints, permanent markers, dry erase markers, dry eraser cleaner, glue sticks, rubber cement, typographic correction fluids, ink dispensers and refills, paint pens, counterfeit bill detection pen, envelope squeeze moisturizers, adhesive label removers, highlighters, and ink jet printer refills. The dispenser 10 can also dispense various vitamins, minerals, supplements and pet vitamins. The dispenser 10 can also dispense a flowable material or mixture in a variety of other applications such as for aroma therapy products, breathalyzer tests, wildlife lures, eyeglass cleaners, portable lighting fuels, bingo and other game markers, float and sinker devices, toilet dyes and treatments, dye markers, microbiological reagents, shoe polishes, clothing stain removers, carpet cleaners and spot removers, tent repair kits, plumbing flux applicator, rust remover, tree wound treatment, animal medicine dispenser, animal measured food dispenser, odor eliminator liquids, multi-purpose oils, ultrasonic cleaner concentrate, manufacturing parts assembly liquids and irrigation solutions. In addition, the dispenser 10 can be used as, or in connection with a suction device for culture sampling, taking various liquid samples, taking various swabbing samples and for acting as a chemical tester, such as may be used for testing drinks for various "date rape" drugs. In addition, the dispenser 10 can dispense a variety of sports products including sports eye black, football hand glue, and baseball glove conditioner and pine tar. The dispenser 10 can dispense any variety of flowable materials including liquids and powders, and further including a liquid and a powder, two or more powders, or two or more liquids. The dispenser 10 may be used as part of 2-part system (mix before use) including a liquid with a powder, a liquid with a liquid, a powder with a powder, or sealed inside another tube or product container or partially sealed, connected or attached to another container. The dispenser 10 may also be used as part of a plunger dispensing system and diagnostic testing.

The dispenser 10 of the present invention may also be used for windshield wiper blade cleaner and other automotive applications, fragrances, pastry gels, eyebrow dye, paints, hair paints, finger nail repair kit, animal medicine dispenser, animal food dispenser, culture media samples, drug test kits, and chemical testers (e.g. date rape etc.). As an illustration, although the applicator has been described as being utilized for mechanical uses, it can similarly be used for applying adhesives, mastic or the like.

While the invention has been described in its preferred embodiments, it is to be understood that the words which have been used are words of description rather than limitation and that changes may be made within the purview of the appended claims without departing from the true scope and spirit of the invention in its broader aspects.

What is claimed is:

1. A dispenser for dispensing flowable materials, the dispenser comprising:
    a container having an outer wall, a dividing wall and a membrane operably connected to define a first chamber and a second chamber, the first chamber configured to contain a first flowable material and the second chamber configured to contain a second flowable material,
    the membrane having a first section having a first rupturable member and a second section having a second rupturable member, the first section separated from the second section by a non-rupturable member.

2. The dispenser of claim 1 wherein the first rupturable member is a first weld seam.

3. The dispenser of claim 2 wherein membrane has a thickness and the first weld seam has a thickness less than the thickness of the membrane.

4. The dispenser of claim 3 wherein the first weld seam comprises a plurality of weld seams.

5. The dispenser of claim 2 wherein the membrane is formed by injected material wherein a first segment of injected material abuts a second segment of injected material to form the first weld seam.

6. The dispenser of claim 2 wherein the first weld seam confronts a channel formed in the membrane.

7. The dispenser of claim 2 wherein pressure applied to the membrane causes rupture of the first weld seam wherein the membrane is configured to allow the first flowable material to flow from the first chamber and past the membrane.

8. The dispenser of claim 7 wherein after the first weld seam is ruptured, the membrane returns to a substantially closed position when pressure is removed from the membrane wherein the membrane is configured such that the first flowable material does not pass from the first chamber and past the membrane.

9. The dispenser of claim 1 wherein the second rupturable member is a second weld seam.

10. The dispenser of claim 9 wherein the membrane has a thickness and the second weld seam has a thickness less than the thickness of the membrane.

11. The dispenser of claim 10 wherein the second weld seam comprises a plurality of weld seams.

12. The dispenser of claim 9 wherein the membrane is formed by injected material wherein a first segment of injected material abuts a second segment of injected material to form the second weld seam.

13. The dispenser of claim 9 wherein pressure applied to the membrane causes rupture of the second weld seam wherein the membrane is configured to allow the second flowable material to flow from the second chamber and past the membrane.

14. The dispenser of claim 13 wherein after the second weld seam is ruptured, the membrane returns to a substantially closed position when pressure is removed from the membrane wherein the membrane is configured such that the second flowable material does not pass from the second chamber and past the membrane.

15. The dispenser of claim 1, wherein the first rupturable member comprises a plurality of weld seams that converge to a point spaced from the non-rupturable member.

16. The dispenser of claim 1, wherein the container has an elongated axis, and the membrane is disposed substantially transverse to the elongated axis.

17. The dispenser of claim 1 wherein the non-rupturable member extends across the membrane.

18. The dispenser of claim 1 wherein the non-rupturable member is positioned such that the first section of the membrane is generally equal in size to the second section of the membrane.

19. The dispenser of claim 1 wherein the dividing wall is a planar member.

20. The dispenser of claim 1 wherein the dividing wall is disposed along the elongated axis such that it divides the container into the first chamber and second chamber wherein the first chamber is generally equally sized to the second chamber.

21. The dispenser of claim 1 wherein prior to the container being sealed, the dividing wall extends past the outer wall of the container.

22. The dispenser of claim 1 wherein the outer wall, dividing wall and membrane are integral.

23. The dispenser of claim 1 wherein the dividing wall has a proximal end that is connected to the membrane.

24. The dispenser of claim 1 wherein the dividing wall has a proximal end connected to the membrane at the non-rupturable member.

25. The dispenser of claim 1 wherein an interface between a proximal end of the dividing wall and the membrane defines the non-rupturable member.

26. The dispenser of claim 1 wherein the container has a distal end and the dividing wall being connected to the membrane at a location remote from the distal end.

27. The dispenser of claim 1 wherein pressure applied to the membrane causes rupture of the first rupturable member.

28. The dispenser of claim 1 wherein pressure applied to the membrane causes rupture of the second rupturable member.

29. The dispenser of claim 1 wherein the first rupturable member is a first weld seam and the second rupturable member is a second weld seam wherein pressure applied to the membrane causes rupture of the first weld seam and the second weld seam wherein the membrane is configured such that the first flowable material flows past the first section of the membrane and the second flowable material flows past the second section of the membrane.

30. The dispenser of claim 29 wherein the first weld seam and the second weld seam are formed such that when pressure is applied to the membrane, the first weld seam ruptures prior to rupture of the second weld seam.

31. The dispenser of claim 1 wherein when pressure is applied to the membrane, a rupture of the first rupturable member occurs prior to a rupture of the second rupturable member.

32. The dispenser of claim 1 being a one-piece injected molded dispenser.

33. The dispenser of claim 1 being of a thermoplastic material.

34. The dispenser of claim 1 further comprising a third chamber positioned adjacent the membrane wherein the third chamber is configured to receive the first flowable material and the second flowable material upon rupture of the first rupturable member and the second rupturable member.

35. The dispenser of claim 34 wherein the mixture is dispensed from the third chamber.

36. The dispenser of claim 34 wherein the third chamber has an interior surface having a circumferential rib.

37. The dispenser of claim 34 wherein the third chamber receives a swab.

38. The dispenser of claim 1 wherein the container has a marking coincident with the membrane indicating where pressure should be applied to rupture the membrane.

39. The dispenser of claim 38 wherein the marking comprises an external extension located on an external surface of the outer wall.

40. A dispenser for dispensing flowable materials, the dispenser comprising:
a container having an outer wall, a dividing wall and a membrane operably connected to define a first chamber and a second chamber; the first chamber configured to contain a first flowable material and the second chamber configured to contain a second flowable material,
the membrane having a first section confronting the first chamber and having a first weld seam and a second section confronting the second chamber and having a second weld seam, the first section separated from the second section by a non-rupturable member operably associated with the dividing wall.

41. The dispenser of claim 40 wherein the dividing wall is positioned such that the first chamber is generally equal in size to the second chamber and the non-rupturable member is positioned such that the first section is generally equal in size to the second section.

42. The dispenser of claim 40 further comprising a third chamber positioned adjacent the membrane wherein the third chamber is configured to receive the first flowable material and the second flowable material upon rupture of the first weld seam and the second weld seam.

43. A dispenser comprising:
a container having an outer wall, a dividing wall and a membrane operably connected to define a first chamber, a second chamber, and a mixing chamber; the first chamber containing a first flowable material and the second chamber containing a second flowable material,
the membrane having a first section confronting the first chamber and having a plurality of first weld seams and a second section confronting the second chamber and having a plurality of second weld seams,
the dividing wall having an end connected to the membrane to define a non-rupturable member that separates the first section and the second section,
the membrane positioned in the container such that the mixing chamber is defined at a location adjacent the membrane wherein pressure applied to the membrane causes rupture of the first weld seams and the second weld seams wherein the first flowable materials flows past the first section of the membrane and into the mixing chamber and the second flowable material flows past the second section of the membrane and into the mixing chamber, wherein the first flowable material mixes with the second flowable material to form a mixture wherein the mixture is dispensed from the mixing chamber.

44. A dispenser for dispensing flowable materials, the dispenser comprising:
a container having an outer wall, a dividing wall and a membrane operably connected to define a first chamber, a second chamber, and a mixing chamber, the first chamber configured to contain a first flowable material and the second chamber configured to contain a second flowable material;
the membrane having a first section confronting the first chamber and having a first plurality of weld seams and a second section confronting the second chamber having a second plurality of weld seams, the dividing wall having an end connected to the membrane to define a non-rupturable member that separates the first section and the second section;

wherein the first plurality of weld seams and the second plurality of weld seams converge to a point spaced from the non-rupturable membrane.

45. The dispenser of claim 44 wherein the membrane has a thickness and the first plurality of weld seams has a thickness less than the thickness of the membrane.

46. The dispenser of claim 44, wherein the membrane has a thickness and the second plurality of weld seams has a thickness less than the thickness of the membrane.

47. The dispenser of claim 44, wherein the plurality of weld seams of the first section and the second section are rupturable.

48. The dispenser of claim 44, wherein the membrane has a thickness and the plurality of weld seams has a thickness less than the thickness of the membrane.

49. A method for dispensing flowable material from a dispenser, the method comprising the steps of:

providing a dispenser having a first chamber and a second chamber configured to contain a first flowable material and a second flowable material to be dispensed, the dispenser further having a membrane with a first section having a first rupturable member and a second section having a second rupturable member that seals the chambers;

applying force to the dispenser to rupture the membrane; and, dispensing the first flowable material and the second flowable material through the membrane.

* * * * *